(12) United States Patent
Brennenstuhl et al.

(10) Patent No.: US 10,300,590 B2
(45) Date of Patent: May 28, 2019

(54) HAND-HELD POWER TOOL WHICH INCLUDES A SHIFTABLE TRANSMISSION

(71) Applicant: Robert Bosch GmbH, Stuttgart (DE)

(72) Inventors: Jens Brennenstuhl, Albershausen (DE); Heiko Roehm, Stuttgart (DE); Andreas Heber, Bissingen an der Tek (DE)

(73) Assignee: ROBERT BOSCH GMBH, Stuttgart (DE)

( * ) Notice: Subject to any disclaimer, the term of this patent is extended or adjusted under 35 U.S.C. 154(b) by 401 days.

(21) Appl. No.: 14/895,864

(22) PCT Filed: Jun. 3, 2014

(86) PCT No.: PCT/EP2014/061423
§ 371 (c)(1),
(2) Date: Dec. 3, 2015

(87) PCT Pub. No.: WO2014/195279
PCT Pub. Date: Dec. 11, 2014

(65) Prior Publication Data
US 2016/0121473 A1    May 5, 2016

(30) Foreign Application Priority Data

Jun. 3, 2013  (DE) .................. 10 2013 210 222
Jun. 2, 2014  (DE) .................. 10 2014 210 344

(51) Int. Cl.
*B25F 5/00*     (2006.01)
*B25B 21/00*    (2006.01)
(Continued)

(52) U.S. Cl.
CPC .............. *B25F 5/001* (2013.01); *B25B 21/00* (2013.01); *B25B 21/008* (2013.01); *F16H 3/48* (2013.01);
(Continued)

(58) Field of Classification Search
CPC .............................. F16H 57/021; B25F 5/001
(Continued)

(56) References Cited

U.S. PATENT DOCUMENTS 5,339,908 A  *  8/1994  Yokota .................. B25B 23/141
                                                        173/216
2009/0098971 A1*  4/2009  Ho ........................ B23B 45/008
                                                        475/153

(Continued)

FOREIGN PATENT DOCUMENTS

DE    10 2009 060929    6/2011
DE    20 2012/006418    8/2012
WO    WO 2011/085871    7/2011

OTHER PUBLICATIONS

International Search Report for PCT/EP2014/061423, dated Jul. 15, 2014.

Primary Examiner — Nathaniel C Chukwurah
(74) Attorney, Agent, or Firm — Norton Rose Fulbright US LLP; Gerard Messina

(57) ABSTRACT

A hand-held power tool which includes a shiftable transmission that is shiftable at least between a first gear and a second gear via a shifting member, in which the shifting member is coupled to a spring element, which for the gear shifting is indirectly or directly actuatable at least via a first and a second shifting element. A coupling element which is coupleable to the spring element is associated with the first shifting element, and the coupling element is configured for allowing gear shifting by actuating the first shifting element only for the case that the second shifting element is in a predefined gear shift position.

34 Claims, 12 Drawing Sheets

(51) Int. Cl.
*F16H 3/48* (2006.01)
*F16H 59/04* (2006.01)
*F16H 63/04* (2006.01)
*F16H 63/08* (2006.01)
*F16H 3/54* (2006.01)
*F16H 63/20* (2006.01)
*F16H 63/42* (2006.01)

(52) U.S. Cl.
CPC ............. *F16H 3/54* (2013.01); *F16H 59/041* (2013.01); *F16H 63/04* (2013.01); *F16H 63/08* (2013.01); *F16H 63/20* (2013.01); *F16H 63/42* (2013.01); *F16H 2200/0034* (2013.01); *F16H 2200/2005* (2013.01)

(58) Field of Classification Search
USPC ............................ 173/47, 216; 475/298, 299
See application file for complete search history.

(56) References Cited

U.S. PATENT DOCUMENTS

2010/0132497 A1\* 6/2010 Hecht .................... B23B 45/008
  74/473.3
2011/0079408 A1\* 4/2011 Grunwald ............. B23B 45/008
  173/47

\* cited by examiner

HAND-HELD POWER TOOL WHICH INCLUDES A SHIFTABLE TRANSMISSION

FIELD OF THE INVENTION

The present invention relates to a hand-held power tool which includes a shiftable transmission that is shiftable at least between a first gear and a second gear via a shifting member.

BACKGROUND INFORMATION

These types of hand-held power tools are believed to be understood from the related art, and include a shiftable transmission which is provided for driving a drive shaft and configured in the manner of a reduction gear unit, via which a predefined motor speed may be reduced to a speed range of the drive shaft which is necessary for a particular application. For example, in cordless screwdrivers, cordless screw drills, and/or cordless percussion drills, motor speeds of approximately 20,000 rpm are reduced to a speed range of approximately 150 rpm to 2,000 rpm.

The reduction gear units are configured, for example, as multistage planetary gears which include at least two gears, so that a user of this type of hand-held power tool may shift it between a first gear and a second gear, for example, the first gear being a comparatively slow gear having high torque, and the second gear being a comparatively fast gear having low torque. For implementing the gears, such a planetary gear customarily includes three planetary stages; for shifting gears, in each case at least one of the three stages is deactivatable via a shifting annulus gear which is displaceable via a manually actuatable actuating element. A spring wire which is actuatable via an associated sliding element and connected to the displaceable shifting annulus gear is used as the actuating element. This spring wire may either be pivoted via a fixed point or shifted linearly.

A disadvantage of the related art is that a sliding element is comparatively difficult to operate, in particular when a user in question is wearing work gloves, which therefore makes handling inconvenient. In addition, when the sliding element is improperly or insufficiently moved, the shifting annulus gear may be moved into an intermediate position, which during operation of the hand-held power tool may result in damage to the planetary gear.

SUMMARY OF THE INVENTION

The object of the present invention, therefore, is to provide a novel hand-held power tool which includes a transmission that is shiftable at least between a first gear and second gear, in which smooth, convenient, and secure gear shifting between the individual gears is possible.

This object is achieved by a hand-held power tool which includes a shiftable transmission, which via a shifting member is shiftable at least between a first gear and a second gear, the shifting member being coupled to a spring element, which for the gear shifting is indirectly or directly actuatable at least via a first and a second shifting element. A coupling element which is coupleable to the spring element is associated with the first shifting element, and is configured for allowing gear shifting by actuating the first shifting element only for the case that the second shifting element is in a predefined gear shift position.

A hierarchization of the gear shifting functionality of the first and second shifting elements may thus be made possible, in which it is predefinable, via the second shifting element, whether or not gear shifting of the shiftable transmission of the hand-held power tool may be effectuated by actuating the first shifting element.

According to one specific embodiment, the coupling element is configured for coupling the spring element to the first shifting element when the first shifting element is actuated, if the second shifting element is in the predefined gear shift position.

The hierarchization according to the present invention of the gear shifting functionality of the first and second shifting elements of the hand-held power tool is easily achievable in this way.

The coupling element may be configured for carrying out, after a gear shifting by actuating the first shifting element, an inverse gear shifting by releasing the first shifting element.

For example, when the second gear is active, the shiftable transmission of the hand-held power tool shifts into the first gear by an actuation of the first shifting element, and automatically shifts back into the second gear after the hand switch is released by the user.

According to one specific embodiment, the spring element includes a ring-shaped base body which is situated, at least in sections, in the area between the shifting member and an associated gear housing in which the shiftable transmission is situated.

Manufacture of the spring element, for example as a punched sheet metal part, which is suitable for mass production and cost-effective is thus possible with a high level of dimensional accuracy and constant spring characteristics. In addition, problem-free integration of the spring element into existing designs of hand-held power tools, such as drills, cordless screw drills, percussion screwdrivers, or the like is possible.

The spring element may include a ring-shaped base body which is situated, at least in sections, in the area between a gear housing, in which the shiftable transmission is situated, and a tool housing.

Further options for integrating the shiftable transmission into the tool housing of the hand-held power tool are thus provided.

According to one specific embodiment, the spring element includes at least two radially inwardly directed cam latches which are coupled to the shifting member, and which are configured for moving the shifting member into a particular shift position which is associated with the first or second gear when the spring element is actuated for the gear shifting.

Due to the cam latches which are integrally formed on the ring-shaped base body of the spring element, a coupling to the shiftable transmission is provided which has a structurally simple design.

The spring element may include at least two radially outwardly directed control latches for controlling the spring element, at least one first control latch being coupleable to the first shifting element, and at least one second control latch being indirectly or directly coupled to the second shifting element.

Due to the control latches which are likewise integrally formed on the spring element, a direct mechanical coupling of the second shifting element and an indirect coupling of the first shifting element are provided via the coupling element. The reliability of the mechanical coupling is further improved due to the double-latched configuration of the control latches.

The first shifting element may be provided for creating an acceleration function and gear shifting function, and the second shifting element may be provided for creating a gear shifting function and/or an operating mode switching function.

An unambiguous functionality is thus assigned to each of the two shifting elements. As an example, the first shifting element is used as a hand switch which is actuatable with the index finger, and which in particular is configured as an on/off switch and/or an acceleration switch. The second shifting element is configured as a slide switch having two axial end positions for gear shifting of the shiftable transmission. With the aid of the acceleration switch, at least the electric drive motor of the hand-held power tool may be switched on and off, and its speed may be infinitely variable. In addition, the rotational direction of the drive motor may optionally be reversed with the aid of the acceleration switch or some other shifting element.

According to one specific embodiment, an acceleration range is associated with the first shifting element, and during an actuation of the first shifting element is limited at least to an actuation range between a released position of the first shifting element and a shift point in which gear shifting takes place between the first and the second gear.

This results in a flexible, smooth shifting behavior of the shiftable transmission, in less susceptibility to wear, and in reduced shifting jolts during a gear shifting operation from the first gear into the second gear.

The coupling element may include a control cam which is engaged with a guide cam formed on the first shifting element, so that the coupling element is pivotable about an associated transverse axis with the aid of the first shifting element in order to actuate the spring element.

Due to this design, the spring element may be indirectly controlled via the coupling element with the aid of the first shifting element or the acceleration switch.

The coupling element may include at least one control latch receptacle for at least temporarily accommodating at least one control latch of the spring element.

A constructively simple temporary linkage of the coupling element to the first, i.e., bottom, control latch, of the spring element is thus achievable.

According to one specific embodiment, the spring element is pivotably supported on at least two body edges, in each case in an at least approximately V-shaped bearing groove.

In this way a smooth bearing of the spring element is provided, and at the same time the movability of the spring element is predefined largely without restriction.

The at least two body edges may be configured as radial extensions on a ring-shaped base body of the spring element.

The body edges may thus be easily manufactured integrally with the spring element, for example in the course of a suitable punching-out process for the spring element.

A flashing may be associated with each at least approximately V-shaped bearing groove.

The so-called "digging in" of the generally metallic sharp body edges of the spring element, which for example is punched out of a metal sheet, into the V-shaped bearing grooves of the gear housing is thus avoided, and a comparatively long service life of the shiftable transmission, and thus of the overall hand-held power tool, is made possible.

According to one specific embodiment, a spring member for generating a pressure point is associated with the first shifting element.

The user of the hand-held power tool is thus provided with feedback, which is clearly perceivable acoustically and/or haptically, concerning the actuation state of the first shifting element or acceleration switch.

The second shifting element may have at least one gap which expands in a wedge shape for controlling at least one control latch of the spring element.

A smooth linkage of the second shifting element for the gear shifting to the spring element, which has little or no adverse effect on the deflection movement of the spring element, is thus provided.

According to one specific embodiment, the shiftable transmission is configured in the manner of a planetary gear which includes at least one planetary stage, the shifting member being configured in the manner of a shifting annulus gear.

A design of the shiftable transmission which is in particular radially compact is thus provided.

The shifting member for deactivating at least one planetary stage may be radially coupled to at least one planet carrier of one of the at least one planetary stage(s).

An optimal force flow through the shiftable transmission is thus provided in both shifting states.

According to another specific embodiment, a display device is associated with the second shifting element, and the second shifting element is coupled to the shifting member via the spring element in such a way that the display device displays an active gear in each case of the shiftable transmission as a function of the first and second shift positions of the shifting member.

Clear visual feedback of a particular shifting state of the planetary gear to the user of the hand-held power tool is thus possible.

According to one specific embodiment, the spring element is configured in the manner of a bistable spring element which assumes a stable shift position in each case in a first shift position of the shifting member associated with the first gear, and in a second shift position of the shifting member associated with the second gear, and which assumes an unstable position in an intermediate position of the shifting member which is situated between the first and second shift positions of the shifting member.

The present invention thus allows a reliable, low-wear shifting operation to be carried out.

The object stated above is also achieved by a hand-held power tool which includes a shiftable transmission for driving a drive shaft, which is situated in a gear housing and is shiftable at least between a first gear and a second gear via a shifting member. An actuating element which is pivotably supported in the gear housing is associated with the shifting member, the actuating element being configured as a bistable spring element and situated, at least in sections, in the area between the shifting member and the gear housing. The bistable spring element is actuatable for the gear shifting, and assumes a stable shift position in at least one shift position of the shifting member associated with the first or second gear, and assumes an unstable position in an intermediate position of the shifting member which is situated between the shift positions of the shifting member associated with the first and second gears.

The present invention thus allows the provision of a hand-held power tool in which simple, smooth, and convenient gear shifting between the first and second gears is made possible by using a bistable spring element as the actuating element. The bistable spring element ensures that a shifting operation in question is completely and correctly carried out in each case with reduced shifting force, so that secure, reliable gear shifting is made possible, a particular shift position of the bistable spring element being coupled to an associated shift position of the shifting member. In addition, a compact, shortened design of the hand-held power tool with short tolerance chains may be made possible by situating the bistable spring element in the area between the shifting member and the gear housing; the number and size of necessary openings on the gear housing may be at least reduced, and an at least largely grease-resistant gear housing may thus be provided. In particular, by the use of the bistable spring element, predefined shift positions of the shifting member may be defined, and corresponding gear shiftings may be speeded up and thus temporally shortened.

According to one specific embodiment, the bistable spring element includes a ring-shaped base body situated in the area between the shifting member and the gear housing.

It is thus possible to provide a robust and stable bistable spring element.

The bistable spring element may include at least two radially inwardly directed cam latches which are coupled to the shifting member and which are configured for moving the shifting member into a shift position associated in each case with the first or second gear, when the bistable spring element for the gear shifting is actuated.

Secure, reliable entrainment or displacement of the shifting member by the bistable spring element during gear shifting may thus be ensured.

According to one specific embodiment, the bistable spring element includes at least two radially outwardly directed control latches which are configured for actuating the bistable spring element for the gear shifting via at least a first or a second shifting element.

The present invention thus allows the provision of a hand-held power tool which easily allows use of more than one shifting element for the gear shifting. A suitable shifting element for the gear shifting may thus be provided, for example for each hand of a user of the hand-held power tool, in order to make convenient, user-friendly gear shifting possible for the user. In addition, predefined shift positions for the shifting elements may be defined by the use of the bistable spring element.

According to one specific embodiment, the bistable spring element includes at least two radially outwardly directed control latches which are configured for allowing an actuation of the bistable spring element for the gear shifting via at least a first and a second shifting element.

Gear shifting may thus take place via two different shifting elements in a convenient, user-friendly manner.

The first shifting element may be provided for creating an acceleration function, and the second shifting element may be provided for creating a gear shifting function.

Different operating switches may thus be used on the hand-held power tool for the gear shifting.

According to one specific embodiment, the bistable spring element is pivotably supported in the gear housing on at least two body edges.

The present invention thus allows the provision of a hand-held power tool in which a bistable spring element for the gear shifting may be situated in the hand-held power tool in a space-saving manner. In addition, synchronization of the components used for the gear shifting may easily take place without components specifically provided for this purpose.

The at least two body edges may be configured as radial extensions on the ring-shaped base body of the bistable spring element.

An uncomplicated and operationally reliable bistable spring element may thus be provided.

A bearing element configured in the manner of a bearing plate for pivotably supporting the bistable spring element may be situated in the gear housing.

A stable, reliable bearing of the bistable spring element in the gear housing may thus be made possible.

At least two axial bearing arms for pivotably supporting the bistable spring element may be formed on the bearing element.

A simple, cost-efficient bearing element for pivotably supporting the bistable spring element may thus be provided.

According to one specific embodiment, the shiftable transmission is configured in the manner of a planetary gear which includes at least one planetary stage, the shifting member being configured in the manner of a shifting annulus gear. The planetary gear may also be configured with two, three, or more planetary stages.

A robust and operationally reliable transmission may thus be used in an implementation of the hand-held power tool.

According to one specific embodiment, the bistable spring element for the gear shifting is indirectly or directly actuatable at least via a first shifting element and a second shifting element, a coupling element which is coupleable to the bistable spring element being associated with the first shifting element, the coupling element being configured for gear shifting by actuating the first shifting element only for the case that the second shifting element is in a predefined gear shift position.

A hierarchization of the gear shifting functionality may easily be made possible via a first and second shifting elements, in which it is predefinable, via the second shifting element, whether or not gear shifting of the shiftable transmission of the hand-held power tool may be effectuated by actuating the first shifting element.

The present invention is explained in greater detail in the following description with reference to exemplary embodiments illustrated in the drawings.

DETAILED DESCRIPTION

Figure 1:
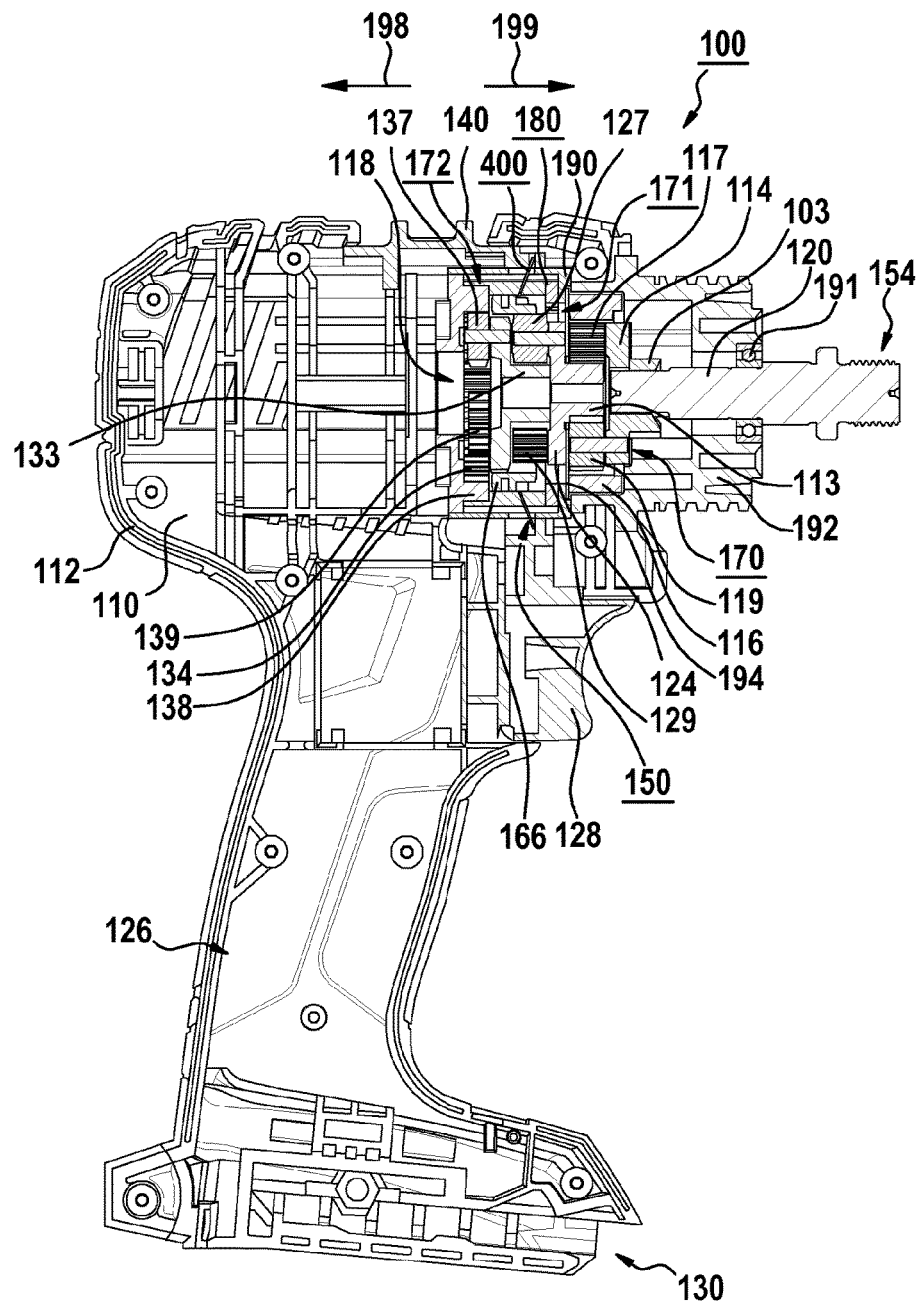
FIG. 1 shows a partially sectional, perspective view of a hand-held power tool which includes a bistable spring element for the gear shifting, according to one specific embodiment.

In the following description, the terms "bottom" and "top," "front" and "rear," and "left" and "right" refer to the particular figure of the drawing, and may vary between different figures of the drawing, depending on an orientation (landscape or portrait format) selected in the figure of the drawing. In this regard, the term "right" is also used as a synonym for "front," and the term "left" is also used as a synonym for "rear." Components which are identical or which have a similar function are generally described only once in the description of the various drawings, and are denoted by the same reference numerals in the drawings.

FIG. 1 shows an example of a hand-held power tool 100 which is operable at least in a first gear and a second gear, and which includes a tool housing 110 with a handle 126. As an example, tool housing 110 has a two-part design with housing shells which are fastened together, of which only one housing shell 112, at the rear in FIG. 1, is shown here.

Hand-held power tool 100 may be mechanically and electrically connectable to a rechargeable battery pack for supplying power at an interface 130, independently of the power grid. In FIG. 1, hand-held power tool 100 is configured as a cordless screwdriver as an example. However, it is pointed out that the present invention is not limited to a cordless screwdriver, and instead may be used for different hand-held power tools which are operable at least in a first gear and a second gear, regardless of whether the hand-held power tool is operable dependent on the power grid or independently of the power grid with a rechargeable battery pack, for example for a screw drill or cordless screw drill, a percussion screwdriver or cordless percussion screwdriver, a percussion drill or cordless percussion drill, and so forth.

According to one specific embodiment, a shiftable transmission 118 for driving a drive shaft 120, for example a drive spindle, is situated in tool housing 110, the drive shaft being rotationally movably supported on tool housing 110 via at least one roller bearing 191. As illustrated, shiftable transmission 118 is situated in a gear housing 190, which in turn is situated in tool housing 110. Transmission 118 is driven by an associated drive motor which is actuatable, i.e., switchable on and off, via a hand switch 128, for example, and which may be any type of motor, for example an electronically commutated motor or a direct current motor, the drive motor may be electronically controllable or regulatable in such a way that a change in rotational direction as well as specification of a desired rotational speed are achievable. The mode of operation and the design of a suitable drive motor are well known from the related art, so that an illustration of the drive motor is dispensed with in FIG. 1 for the purpose of simplicity of the drawing, and a detailed description of the drive motor is dispensed with here for the purpose of brevity of the description.

A tool receptacle, which may include a bit holder or a chuck, for example, which is fastenable to a fastening interface 154 of drive shaft 120, is associated with shiftable transmission 118. In addition, an optional torque clutch may be associated with shiftable transmission 118. However, it is pointed out that the mode of operation and the design of a suitable tool receptacle and of a suitable torque clutch are well known from the related art, so that their illustration is dispensed with in FIG. 1 for the purpose of simplicity of the drawing, and a detailed description thereof is likewise dispensed with here for the purpose of brevity of the description.

Shiftable transmission 118 may be shiftable at least between a first gear and a second gear via a shifting member 166. The first gear is, for example, a comparatively slow gear having high torque, and the second gear is a comparatively fast gear having low torque. For this purpose, an actuating element 150 which is pivotably supported in gear housing 190 is associated with shifting member 166, according to one specific embodiment the actuating element being configured as a bistable spring element 400 and situated, at least in sections, in the area between shifting member 166 and gear housing 190.

Bistable spring element 400 is actuatable at least for the gear shifting, and may assume a stable shift position in at least one shift position of shifting member 166 associated with the first or second gear. Bistable spring element 400 assumes a stable shift position in particular in both shift positions of shifting member 166 associated with the first or second gear. Bistable spring element 400 may assume an unstable position in an intermediate position of shifting member 166, i.e., in a position between those shift positions of shifting member 166 which are associated with first and second gears.

Bistable spring element 400 may be configured for the gear shifting of shiftable transmission 118 via at least one shifting element, and in the illustration, two shifting elements 128, 140. First shifting element 128 is, for example, hand switch 128 of hand-held power tool 100, which may be configured for switching hand-held power tool 100 on and off and also for implementing an acceleration function. Hand switch 128 is in particular an on/off switch and/or an acceleration switch. As an example, second shifting element 140 is supported on tool housing 110 in the manner of a separate slide switch, and is configured at least for implementing a gear shifting function. At least slide switch 140 may optionally be lockable on tool housing 110 in associated shift positions.

According to one specific embodiment, shiftable transmission 118 is configured in the manner of a reduction gear unit which includes at least one shiftable gear stage. As illustrated, shiftable transmission 118 is configured in the manner of a planetary gear which includes three planetary stages situated in gear housing 190: a front stage 170, a middle stage 171, and a rear stage 172. For this reason, shiftable transmission 118 is also referred to below as "planetary gear" 118 for simplification of the description.

Front planetary stage 170 may be fixed in a front housing section 192 of gear housing 190 via a retaining plate 194, and as an example includes a sun wheel 113, at least one first and one second planet wheel 117 and 119, a planet carrier 114, and annulus gear 116, which is situated in gear housing 190 in an axially immovable and rotatably fixed manner in the drilling position. Planet carrier 114 is connected to a drive member 103 of drive shaft 120, which together with drive shaft 120 establishes at least a form-fit connection, for example; drive member 103 may be suitably fastened to planet carrier 114 or may be integrally molded onto same or formed in one piece with same.

Middle planetary stage 171 includes, as an example, a sun wheel 133, at least one first planet wheel and one second planet wheel 127 and 129, a planet carrier 124, and shifting member 166, which according to one specific embodiment is configured in the manner of a one-piece shifting annulus gear and is also referred to below as "shifting annulus gear." Alternatively, the shifting member may have a two-piece or two-part design, and may include, for example, an axially immovable inner annulus gear and an axially movable outer shift sleeve. Planet carrier 124 forms sun wheel 113 of front planetary stage 170; sun wheel 113 may be suitably fastened to planet carrier 124, or may be integrally molded onto same or formed in one piece with same. As illustrated, planet carrier 124 is situated, at least in sections, within a bearing element 180 which is configured in the manner of a bearing plate, and situated in gear housing 190 in a rotatably fixed manner. Bistable spring element 400 is pivotably supported on this bearing element 180, as described below for FIGS. 2 and 5.

Rear planetary stage 172 includes, as an example, at least one first planet wheel and one second planet wheel 137 and 139, a planet carrier 134, and an annulus gear 138 which is situated in gear housing 190 in an axially immovable and rotatably fixed manner. During operation of hand-held power tool 100, planet wheels 137, 139 are driven by a sun wheel, not shown for the purpose of simplifying the drawing, which is formed, for example, by a pinion associated with the drive motor. Planet carrier 134 forms sun wheel 133 of middle planetary stage 171; sun wheel 133 may be suitably fastened to planet carrier 134 or may be integrally molded onto same or formed in one piece with same.

During operation of hand-held power tool 100, shifting annulus gear 166 is displaceable in the axial direction of gear housing 190 from a first shift position, shown in FIG. 1, in the direction of an arrow 199 into a second shift position, not shown, by actuating bistable spring element 400 with the aid of first or second shifting element 128, 140. In this regard, the first shift position (at the rear in FIG. 1) is associated, for example, with the second, comparatively fast gear of planetary gear 118 having low torque, and the second shift position is associated, for example, with the first, comparatively slow gear of planetary gear 118 having high torque. By an inverted displacement of shifting annulus gear 166 from its second, front shift position into its first, rear shift position, as indicated by an arrow 198, planetary gear 118 may then be shifted back from the first gear into the second gear.

In its first, rear shift position, shifting annulus gear 166 is connected to planet carrier 134 of rear planetary stage 172 in a rotatably fixed manner, so that this planet carrier 134 and planet wheels 127, 129 of middle planetary stage 171 are likewise connected to one another in a rotatably fixed manner. Middle planetary stage 171 is thus deactivated, so that the second gear is activated. In its second shift position, which corresponds to an axial front position of shifting annulus gear 166 in FIG. 1, the shifting annulus gear is connected to bearing element 180 and thus to gear housing 190 in a rotatably fixed manner, so that middle planetary stage 171 and thus the first gear are activated.

Figure 2:
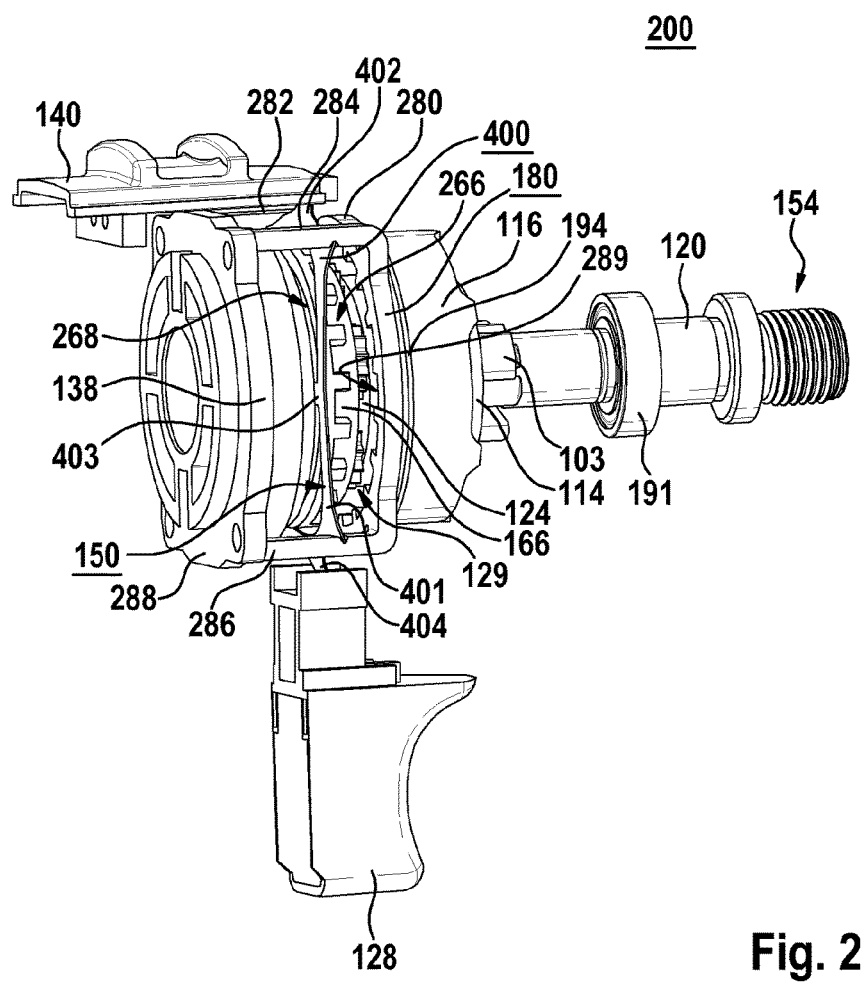
FIG. 2 shows an enlarged perspective view of a detail of the hand-held power tool from FIG. 1.

FIG. 2 shows a system 200 which includes planetary gear 118, drive shaft 120, hand switch 128, and slide switch 140 from FIG. 1 for illustrating an example of one embodiment of shifting annulus gear 166, bearing element 180, and bistable spring element 400 from FIG. 1. In system 200, as an example, annulus gear 138 of rear planetary stage 172 from FIG. 1 is configured, at least in sections, in the manner of a blind flange for closing off planetary gear 118 on the motor side.

Shifting annulus gear 166 may have at least one annular groove 268 on its outer periphery. In addition, at least one first locking geometry 266 may be formed on the outer periphery of the shifting annulus gear.

Bearing element 180 may include a ring-shaped support 280 on which, according to one specific embodiment, at least two or four axial bearing arms 282, 284, 286, 288 may be provided which, starting from ring-shaped support 280, extend in the axial direction at a predefined radial distance across shifting annulus gear 166 in the direction of annulus gear 138. In addition, a second locking geometry 289 may be formed on ring-shaped support 280, and in the first gear of hand-held power tool 100 engages with first locking geometry 266 provided on the outer periphery of shifting annulus gear 166 in order to connect shifting annulus gear 166 to bearing element 180 in a rotatably fixed manner, as described for FIG. 1. Bearing arms 282, 284, 286, 288 may be configured for pivotably supporting bistable spring element 400, as described below for FIG. 5.

According to one specific embodiment, bistable spring element 400 includes a ring-shaped base body 401 which completely encloses shifting annulus gear 166 and which is thus situated in the area between shifting member 166 and gear housing 190 from FIG. 1, as is apparent from viewing FIGS. 1 and 2. Base body 401 is configured as a ring- or annular-shaped leaf spring as an example. Base body 401 may be formed from a punched sheet metal part, for example. In addition, bistable spring element 400 includes at least one and two cam latches 403 (and 405 in FIG. 4) which are radially inwardly directed, starting from ring-shaped base body 401. These cam latches are coupled to shifting annulus gear 166, and are configured for moving annulus gear 166 into the first shift position associated with the second gear or into the second shift position associated with the first gear, as described for FIG. 1, when bistable spring element 400 is actuated for the gear shifting. As illustrated, radially inwardly directed cam latches 403 (and 405 in FIG. 4) engage with annular groove 268 provided on the outer periphery of shifting annulus gear 166.

In addition, according to one specific embodiment, at least one and two control latches 402, 404 which are radially outwardly directed, starting from ring-shaped base body 401, is/are provided on bistable spring element 400. As illustrated, these control latches are oriented at least approximately at a right angle to cam latches 403 (and 405 in FIG. 4), and are configured for allowing an actuation of bistable spring element 400 for the gear shifting, at least via hand switch 128 and/or slide switch 140.

Figure 3:
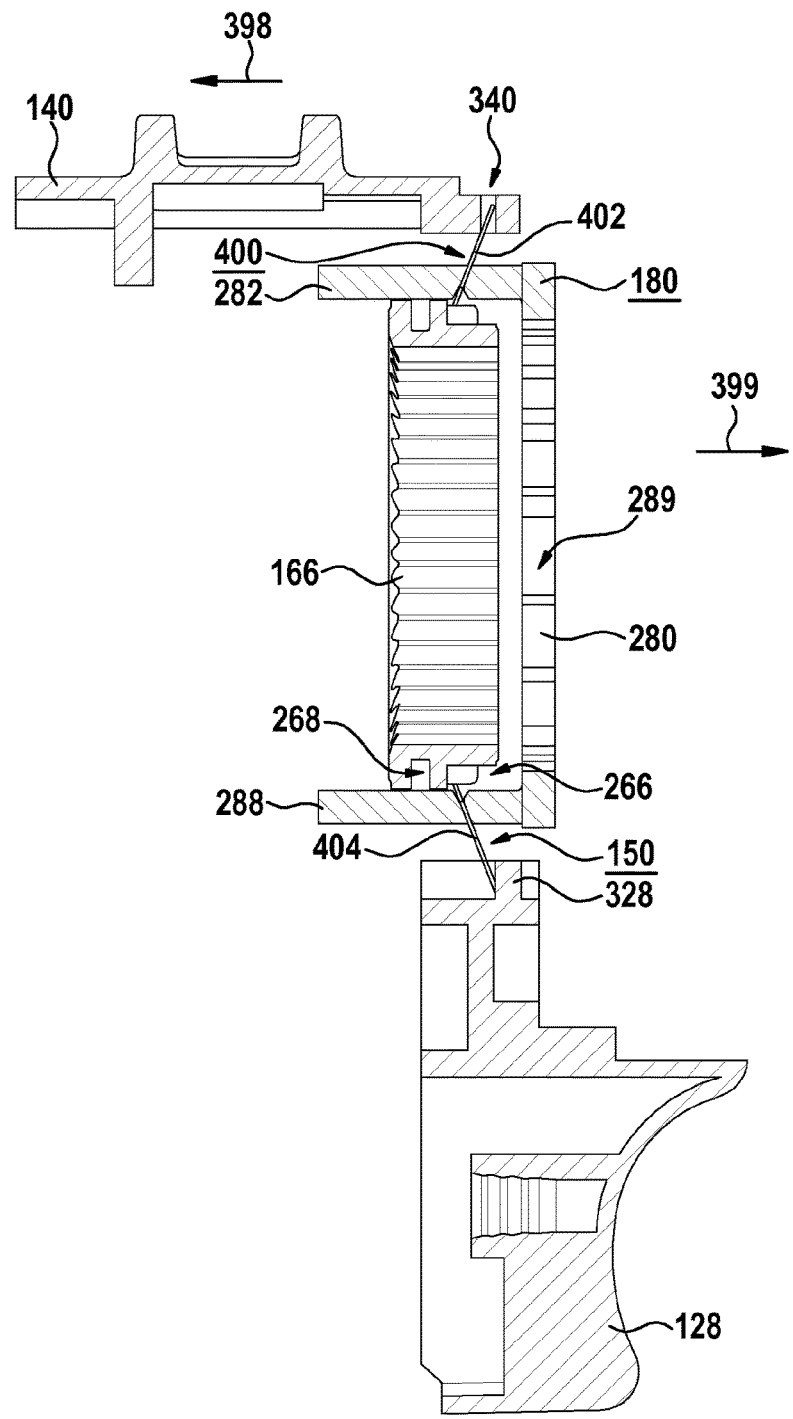
FIG. 3 shows a sectional view of a portion of the detail from FIG. 2.

FIG. 3 shows hand switch 128, slide switch 140, shifting annulus gear 166, bearing element 180, and bistable spring element 400 from FIGS. 1 and 2 for illustrating an example of gear shifting from the second gear into the first gear of hand-held power tool 100 from FIG. 1. FIG. 3 depicts an example of fixing of a first control latch 402 of bistable spring element 400 in groove-shaped receptacle 340 of slide switch 140, and an example of a second control latch 404 of bistable spring element 400 resting against a web-shaped control member 328 of hand switch 128. It may be that only these two control latches 402, 404 pass radially outwardly through gear housing 190 from FIG. 1.

According to one specific embodiment, during operation of hand-held power tool 100 from FIG. 1, either hand switch 128 or slide switch 140 is pressed or shifted in the direction of an arrow 398 for the gear shifting from the second gear into the first gear. Control latch 402 or control latch 404 is thus likewise shifted in the direction of arrow 398, thus causing pivoting of bistable spring element 400 on bearing element 180. Bistable spring element 400, starting from a first stable shift position associated with the second gear, is thus initially transferred into its unstable or metastable position in the direction of an arrow 399, from which, when an associated switch point is exceeded, it jumps into its second stable shift position associated with the first gear, in the manner of a so-called "clicker," in the direction of arrow 399.

Figure 4:
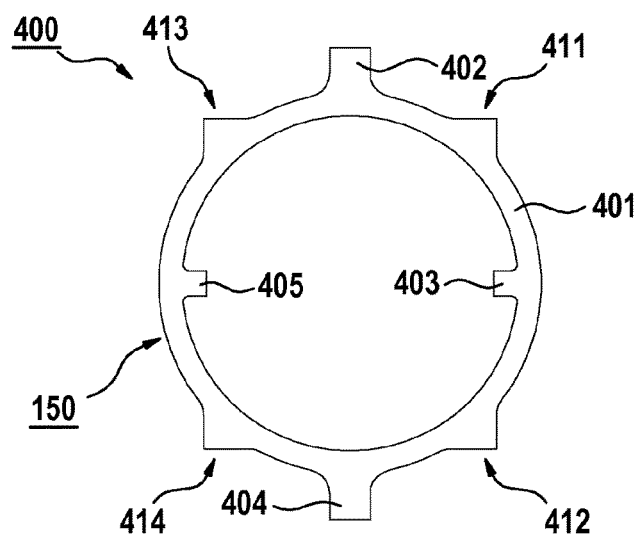
FIG. 4 shows a top view onto the bistable spring element from FIGS. 1 through 3.

FIG. 4 shows bistable spring element 400 from FIGS. 1 through 3 together with ring-shaped base body 401 for illustrating radially outwardly directed control latches 402, 404 and radially inwardly directed cam latches 403, 405, which may be oriented at approximately a right angle to the outwardly directed control latches. In addition, FIG. 4 shows an example of body edges 411, 412, 413, 414 of bistable spring element 400, which may be configured as radial extensions on ring-shaped base body 401 and may be oriented at least approximately in parallel to radially inwardly directed cam latches 403, 405.

Figure 5:
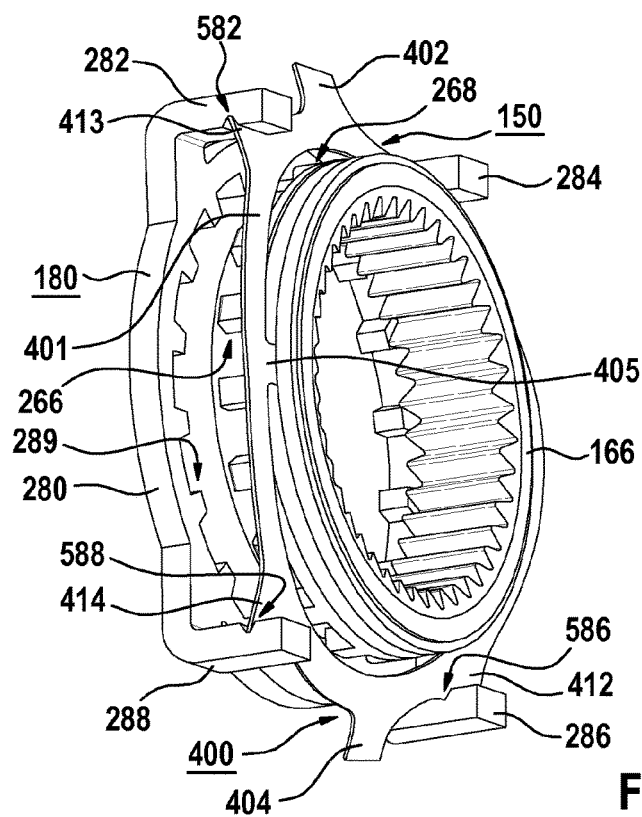
FIG. 5 shows a perspective view of a portion of the detail from FIG. 2, viewed from a viewing angle which is different from that in FIG. 2.

FIG. 5 shows shifting annulus gear 166 and bearing element 180 from FIGS. 1 through 3 and bistable spring element 400 from FIGS. 1 through 4 for illustrating an exemplary pivotable bearing of spring element 400 on bearing element 180 or in gear housing 190 from FIG. 1. According to one specific embodiment, bistable spring element 400 is supported on bearing arms 282, 284, 286, 288 of bearing element 180 on at least two, and as illustrated, on its four, body edges 412, 413, 414 (and 411 from FIG. 4), which are configured as radial extensions on ring-shaped base body 401 of bistable spring element 400. In the illustration, which may be V-shaped associated bearing grooves are formed on bearing arms 282, 284, 286, 288, with which flat body edges 412, 413, 414 (and 411 from FIG. 4) may engage. For example, body edge 412 engages with a bearing groove 586 provided on bearing arm 286, body edge 413 engages with a bearing groove 582 provided on bearing arm 282, and body edge 414 engages with a bearing groove 588 provided on bearing arm 288.

As an example, body edges 412, 414 form a first pivot bearing axis, and body edges 413 (and 411 from FIG. 4) form a second pivot bearing axis, radially inwardly directed cam latches 405 (and 403 from FIG. 4) may be situated in the area between these two pivot bearing axes.

Figure 6:
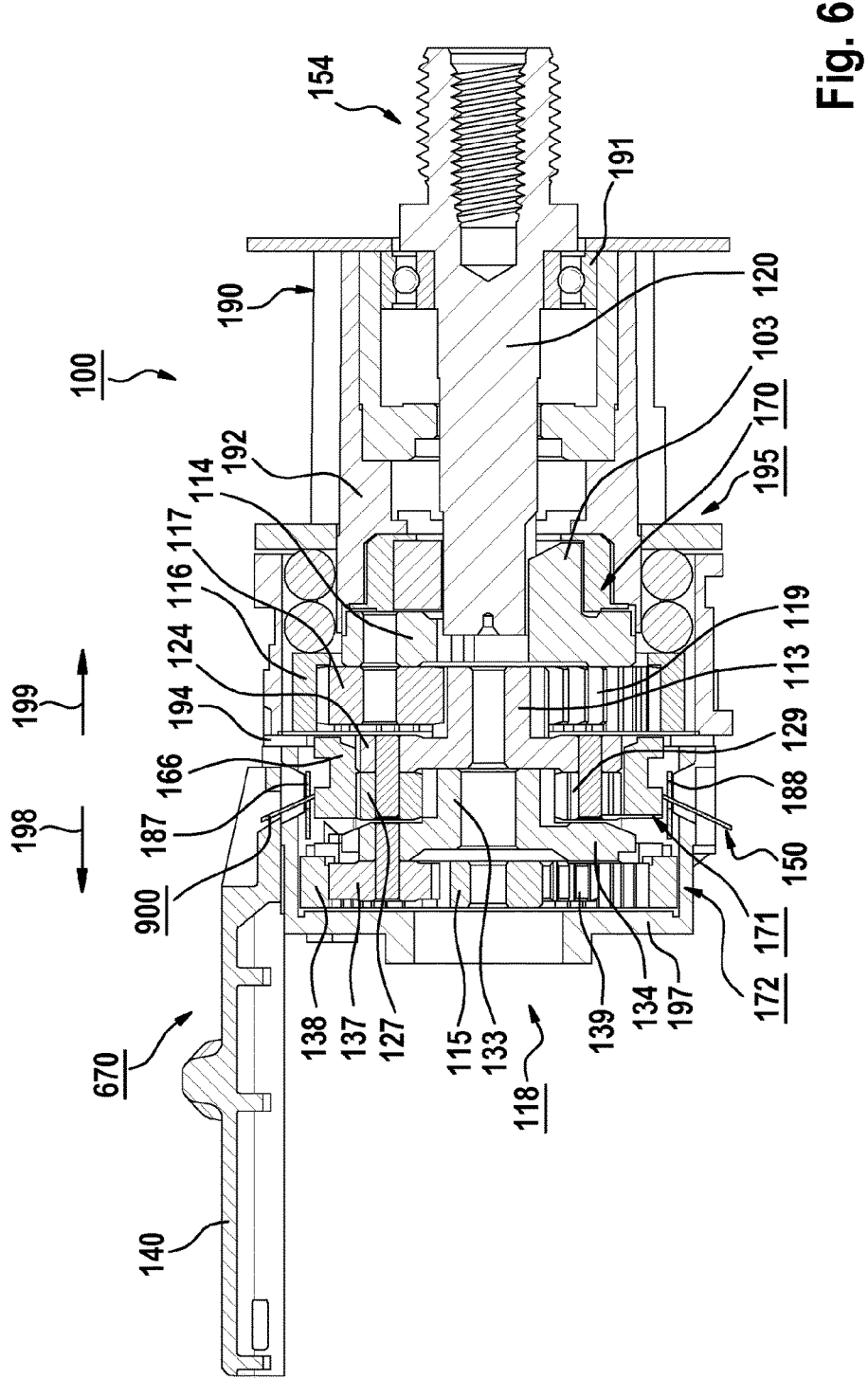
FIG. 6 shows a detail of the hand-held power tool from FIG. 1 together with the drive shaft and the planetary gear driven by an associated drive motor, the planetary gear having a design here according to one alternative specific embodiment as an example.

FIG. 6 shows a detail of hand-held power tool 100 from FIG. 1 together with drive shaft 120 and planetary gear 118, which is driven by an associated drive motor and configured here according to one alternative specific embodiment as an example. However, an illustration of tool housing 110 and handle 126 provided with interface 130, analogously to FIG. 1, has been dispensed with for the purpose of clarity and simplicity of the drawing.

It is pointed out that in hand-held power tool 100 from FIG. 1, structural changes are necessary to allow use of planetary gear 118 according to the alternative specific embodiment. For example, for this purpose an enlargement of tool housing 110 from FIG. 1 may be necessary. However, such structural changes inevitably result and are apparent to those skilled in the art, so that a detailed description of same is dispensed with for the purpose of brevity of the description.

As described for FIG. 1, planetary gear 118, provided with gear housing 190, is configured in the manner of a shiftable transmission for driving drive shaft 120, which as an example is rotatably supported on gear housing 190, and thus at least indirectly, on tool housing 110 from FIG. 1, via the at least one roller bearing 191. A tool receptacle, which may include a bit holder or a chuck, for example, which is fastenable to fastening interface 154 of drive shaft 120 is associated with planetary gear 118. In addition, according to the alternative specific embodiment, a torque clutch 195, only partially schematically indicated here, is associated with planetary gear 118. However, it is pointed out that the mode of operation and the design of a suitable tool receptacle and of a suitable torque clutch are well known from the related art, so that their complete illustration in FIG. 6 is dispensed with for the purpose of simplicity of the drawing, and a detailed description thereof is likewise dispensed with here for the purpose of brevity of the description.

Planetary gear 118, the same as described for FIG. 1, may be shiftable at least between the first gear and the second gear via shifting member 166, first gear being, for example, the comparatively slow gear having high torque, and the second gear being the comparatively slow gear having low torque. For this purpose, actuating element 150, which is pivotably supported in gear housing 190, is associated with shifting member 166, and may be configured in the manner of a spring element, for example as a bistable spring element 400 from FIG. 4, or as bistable spring element 900, described in greater detail for FIG. 9, and is situated, at least in sections, in the area between shifting member 166 and tool housing 110 from FIG. 1 and/or gear housing 190.

For illustration of an example of one specific embodiment of the present invention, the specific embodiment is described in greater detail below with reference to bistable spring element 900. However, it is pointed out that actuating element 150, configured as a spring element, does not necessarily have to be configured as a bistable spring element, and instead may have other shapes and configurations.

Bistable spring element 900 is actuatable at least for the gear shifting, and may assume a stable shift position in at least one shift position of shifting member 166 associated with the first or second gear. Bistable spring element 900 may assume an unstable position in an intermediate position of shifting member 166, i.e., in a position between those shift positions of shifting member 166 associated with the first gear and the second gear.

Bistable spring element 900 may be configured for the gear shifting of planetary gear 118 via at least one, and may be via both, shifting elements 128, 140 from FIG. 1. As illustrated, in areas in which bistable spring element 900 protrudes, at least in sections, from gear housing 190 in the direction of the two shifting elements 128, 140, bistable spring element 900 is provided with associated sealing plates 187, 188 for sealing off gear housing 190.

However, it is pointed out that for the purpose of simplicity of the drawing, only shifting element 140, which may be configured in the manner of a slide switch and used as a gear shifter, is shown, while an illustration of shifting element 128, configured at least as an acceleration switch, has been dispensed with for the purpose of simplicity and clarity of the drawing. Shifting element 140, configured in the manner of a slide switch, may be at least axially displaceable on tool housing 110 from FIG. 1, and/or at least partially supported on a rear housing section 197 of gear housing 190 and configured as a gear shifter at least for implementing a gear shifting function. Shifting element 140 may optionally be lockable in associated gear shift positions. In addition, according to one specific embodiment, second shifting element 140 includes a display device 670 which is used for displaying to a user of hand-held power tool 100 a particular shifting state of planetary gear 118 based on a particular gear shift position of second shifting element 140, as described below for FIG. 10.

As described for FIG. 1, planetary gear 118 is configured in the manner of a reduction gear unit which includes at least one shiftable gear stage. As illustrated, planetary gear 118 is configured with three planetary stages, i.e., front stage 170, middle stage 171, and rear stage 172, situated in gear housing 190.

Front planetary stage 170 may be fixed by retaining plate 194 in front housing section 192 of gear housing 190, and as an example includes sun wheel 113, at least first and second planet wheels 117 and 119, planet carrier 114, and annulus gear 116, which is situated in gear housing 190 in an axially immovable and rotatably fixed manner in the drilling position. Planet carrier 114 is connected to drive member 103 of drive shaft 120, which forms at least a form-fit connection, for example, with drive shaft 120; drive member 103 may be suitably fastened to planet carrier 114 or may be integrally molded onto same or formed in one piece with same.

As an example, middle planetary stage 171 includes sun wheel 133, at least first and second planet wheels 127 and 129, planet carrier 124, and shifting member 166, which according to one specific embodiment is configured in the manner of a one-piece shifting annulus gear and is also referred to below as a "shifting annulus gear." Alternatively, the shifting member may have a two-piece or two-part design, and may include, for example, an axially immovable inner annulus gear and an axially movable outer shift sleeve. Planet carrier 124 forms sun wheel 113 of front planetary stage 170; sun wheel 113 may be suitably fastened to planet carrier 124, or may be integrally molded onto same or formed in one piece with same.

As an example, rear planetary stage 172 includes at least first and second planet wheels 137 and 139, planet carrier 134, and annulus gear 138 which is situated in gear housing 190 in an axially immovable and rotatably fixed manner. During operation of hand-held power tool 100, planet wheels 137, 139 are driven by a sun wheel 115, only schematically indicated, which is formed, for example, by a pinion associated with the drive motor. Planet carrier 134 forms sun wheel 133 of middle planetary stage 171; sun wheel 133 may be suitably fastened to planet carrier 134 or may be integrally molded onto same or formed in one piece with same.

During operation of hand-held power tool 100, shifting annulus gear 166 is displaceable in the axial direction of gear housing 190 from a front shift position, shown in FIG. 6, in the direction of an arrow 198 into a rear shift position, not shown, by actuating bistable spring element 900, for example with the aid of shifting element 140. In planetary gear 118 from FIG. 6 configured according to the alternative specific embodiment, in contrast to planetary gear 118 configured according to the specific embodiment described for FIG. 1, the front shift position is associated with the second, comparatively fast gear of planetary gear 118 having low torque, and the rear shift position is associated with the first, comparatively slow gear of planetary gear 118 having high torque. By an inverted displacement of shifting annulus gear 166 from its rear shift position into its front shift position, as indicated by an arrow 199, planetary gear 118 may then be shifted back from the first gear into the second gear.

Figure 12:
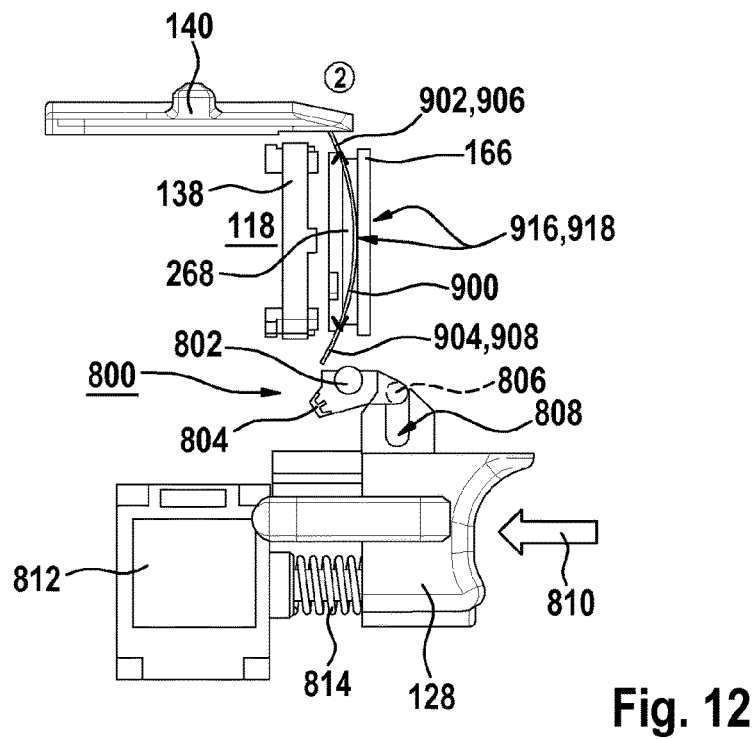
FIG. 12 shows a schematic view of the two shifting elements together with the bistable spring element and a coupling element.
Figure 14:
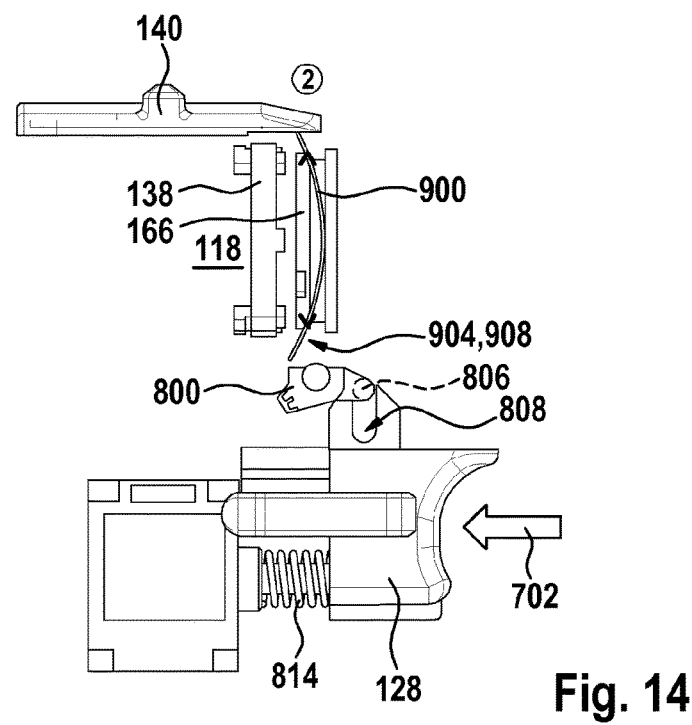
FIGS. 14, 15 and 16 show a schematic illustration of a gear shifting operation in the alternative specific embodiment of the shiftable transmission from FIG. 6, in which the transmission is in an initial gear shift position for the second gear.
Figure 15:
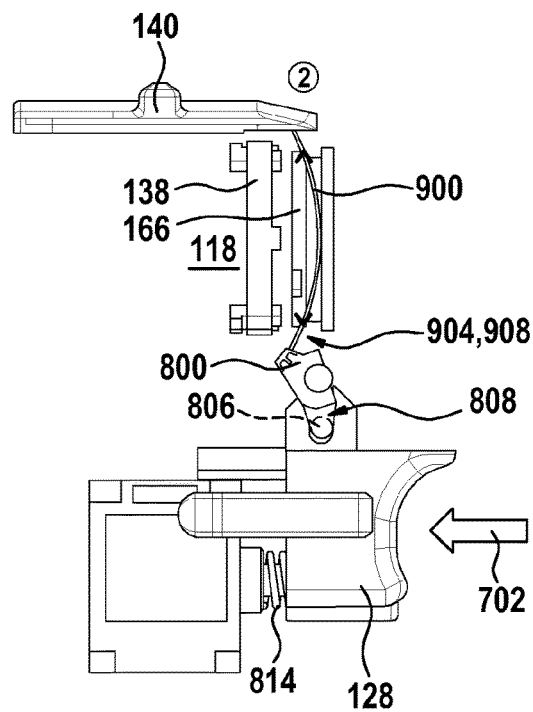

In its front shift position, which in FIGS. 12, 14, and 15 is depicted by an encircled "2" in the illustration, shifting annulus gear 166 is connected in a rotatably fixed manner to planet carrier 124 of middle planetary stage 171, so that this planet carrier 124 and planet wheels 127, 129 of middle planetary stage 171 are likewise connected to one another in a rotatably fixed manner. Middle planetary stage 171 is thus deactivated, so that the second gear is activated. In its rear shift position, which in FIGS. 16 through 19 is depicted by an encircled "1" in the illustration, shifting annulus gear 166 is connected to annulus gear 138 of rear planetary stage 172 and thus to gear housing 190 in a rotatably fixed manner, so that middle planetary stage 171 and thus the first gear are activated. The shift positions of shifting annulus gear 166 and thus of shiftable transmission 118 correspond in each case to an associated gear shift position of second shifting element 140, which may be configured as a slide switch, and which in addition to its primary gear shifting function may also have at least one operating mode switching function.

Figure 7:
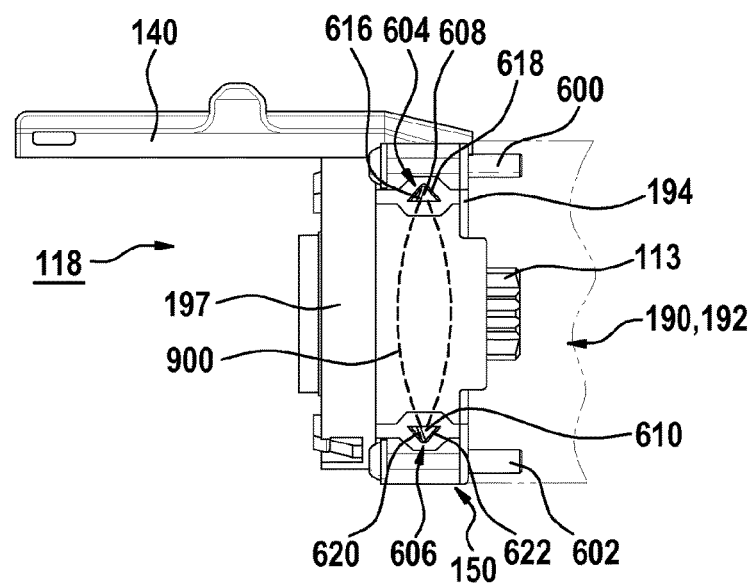
FIG. 7 shows a perspective top view onto a housing section of the gear housing of the planetary gear from FIG. 6.

FIG. 7 shows rear housing section 197 of planetary gear 118 from FIG. 6, in which sun wheel 113 and actuating element 150, configured as bistable spring element 900, are accommodated, the bistable spring element, the same as described for FIG. 6, being controllable with the aid of second shifting element 140, which may be configured as a slide switch, and shifting element 128 from FIG. 1, configured as an acceleration switch. The fastening of housing section 197 to gear housing 190, indicated by a dotted line, or to front housing section 192 thereof may take place with the aid of at least one, and in the illustration four, fastening elements, of which only fastening elements 600, 602 are illustrated here. These may be configured, for example, as threaded bolts, rivets, or the like.

According to one specific embodiment, bistable spring element 900, which may be mechanically pretensioned in the axial direction of planetary gear 118 and thus arched, and which is configured as a punched sheet metal part, for example, is clamped between at least two or four bearing grooves which are V-shaped in each case, of which only the two V-shaped bearing grooves 604, 606 on the front side are visible here. Bearing grooves 604, 606 may pass through housing section 197 of gear housing 190, and thus may form in each case triangular lateral openings in rear housing section 197, of which only the two openings 608, 610 on the front side are visible here. Openings 608, 610 of V-shaped bearing grooves 604, 606 may face one another.

Bearing grooves 604, 606 and triangular openings 608, 610 allow a particularly smooth bearing and movement of bistable spring element 900 in its provided deflection range, so that the change between the two stable states of spring element 900 takes place fluidly and with a consistently reproducible actuating force. Both possible stable (shifting) states or shift positions of bistable spring element 900 are indicated in each case by a curved dashed line in FIG. 7. Bearing grooves 604, 606 and openings 608, 610 in each case have oppositely facing V-shaped inclined walls 616, 618 and 620, 622, respectively, against which spring element 900, at least in areas, rests in alternation in its two stable shift positions. The same applies for the V-shaped bearing grooves and triangular openings on the rear side, not illustrated here.

Figure 8:
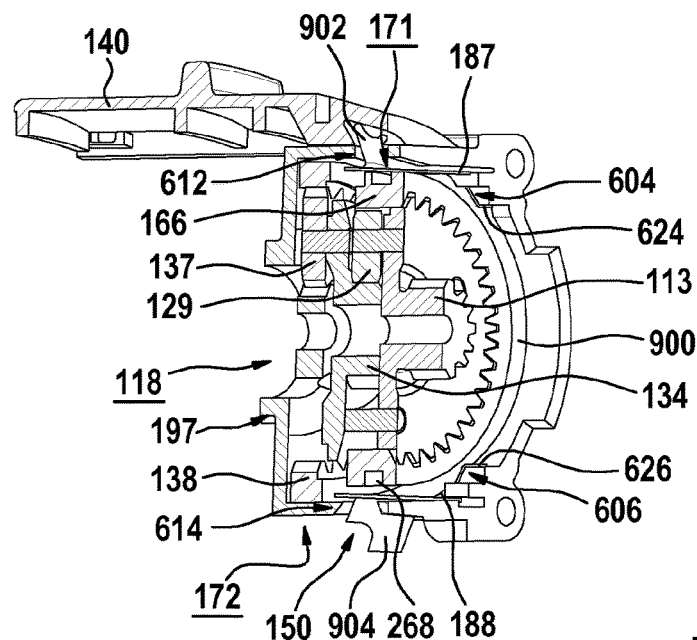
FIG. 8 shows a longitudinal section of the housing section of the gear housing from FIG. 7.

FIG. 8 shows rear housing section 197 from FIGS. 6 and 7, in which rear stage 172 of planetary gear 118 together with planet wheel 137, situated on planet carrier 134, and associated annulus gear 138 are accommodated. In addition, middle stage 171 of planetary gear 118, together with shifting member 166, configured as a shifting annulus gear, and associated planet wheel 129 are integrated into housing section 197. Actuating element 150, which may be configured as bistable, ring-shaped spring element 900, is actuatable with the aid of second shifting element 140, configured as a slide switch. For this purpose, at least one, and in the present case two as an example, upper control latches are formed on spring element 900, of which only one upper control latch 902 is visible here. Diametrically opposite from these upper control latches, at least one and in the present example, two lower control latches are integrally formed on spring element 900, of which only one lower control latch 904 is shown here. These two lower control latches are used for controlling or actuating bistable spring element 900 with the aid of first shifting element 128 from FIG. 1, which may be implemented as a hand switch or an acceleration switch.

All control latches 902, 904 may pass through associated sealing plates 187, 188 accommodated in rear housing section 197, and are guided on both the top side and bottom side by recesses 612, 614, respectively, or slits or gaps in housing section 197. Recesses 612, 614 each may have a trapezoidal cross-sectional geometry which expands radially outwardly, and whose walls are in each case inclined with respect to one another.

For reducing wear, rear housing section 197 of planetary gear 118 may be filled, at least in areas, with a low-viscosity lubricant, in particular grease. Sealing plates 187, 188 on the one hand prevent grease from escaping, and on the other hand simplify the mounting of planetary gear 118, since opening geometries of recesses 612, 614 may have larger dimensions due to being subsequently covered by sealing plates 187, 188, thus simplifying the installation of spring element 900 and the assembly of planetary gear 118.

According to the specific embodiment from FIG. 4, bistable spring element 900, which is actuatable with the aid of second shifting element 140, among other elements, also may include at least two radially inwardly directed and particularly may be diametrically opposed cam latches (concealed here), which engage with annular groove 268 in the outer periphery of shifting member 166, configured as a shifting annulus gear, to allow axial displacement of the shifting member. A change from the first gear into the second gear of planetary gear 118, and vice versa, is possible due to the axial displacement of shifting member 166 of planetary gear 118, as already explained in the description for FIG. 6.

A metallic flashing 624, 626 may be situated in each case in the two V-shaped bearing grooves 604, 606 shown and in the two other concealed bearing grooves to prevent spring element 900 from "digging into" the material of rear housing section 197. This design has proven to be particularly advantageous when rear housing section 197 of planetary gear 118 is made of a plastic material, at least in areas. Flashings 624, 626, including the two additional flashings not illustrated here, each have an approximately V-shaped cross-sectional geometry which corresponds to the likewise V-shaped cross-sectional geometry of the bearing grooves and their associated triangular openings.

Figure 9:
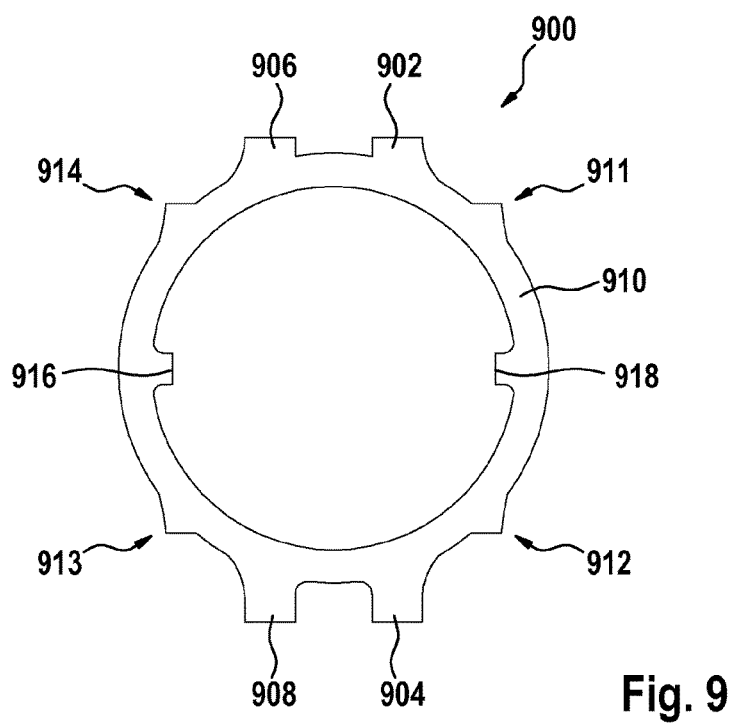
FIG. 9 shows a top view onto a bistable spring element of the planetary gear according to the alternative specific embodiment.

FIG. 9 shows bistable spring element 900 of the alternative specific embodiment of planetary gear 118 from FIGS. 6 through 8. This bistable spring element 900 may include a total of four control latches, the upper and lower control latches 902, 904 from FIG. 8 as well as two additional upper and lower control latches 906, 908. These control latches may be integrally formed on a base body 910 of bistable spring element 900, which may be essentially ring- or annular-shaped but which may also have other shapes, such as polygonal. The two upper control latches 902, 906 and the two lower control latches 904, 908 may be integrally formed in pairs in each case, at least approximately diametrically opposite one another and directed radially outwardly, on base body 910, which may be configured as a punched sheet metal part. Base body 910 is configured as a ring- or annular-shaped leaf spring as an example.

For bearing within the alternative specific embodiment of planetary gear 118 from FIGS. 6 through 8, in each case one, and thus in the illustration a total of four, radially outwardly directed body edges 911 through 914 having an approximately triangular outer contour in each case may be formed in each quadrant of base body 910 of bistable spring element 900. With the aid of body edges 911 through 914, spring element 900, as already explained for FIG. 8, is reliably supported on all sides in the V-shaped bearing grooves and the triangular openings in rear housing section 197 of planetary gear 118.

Figure 10:
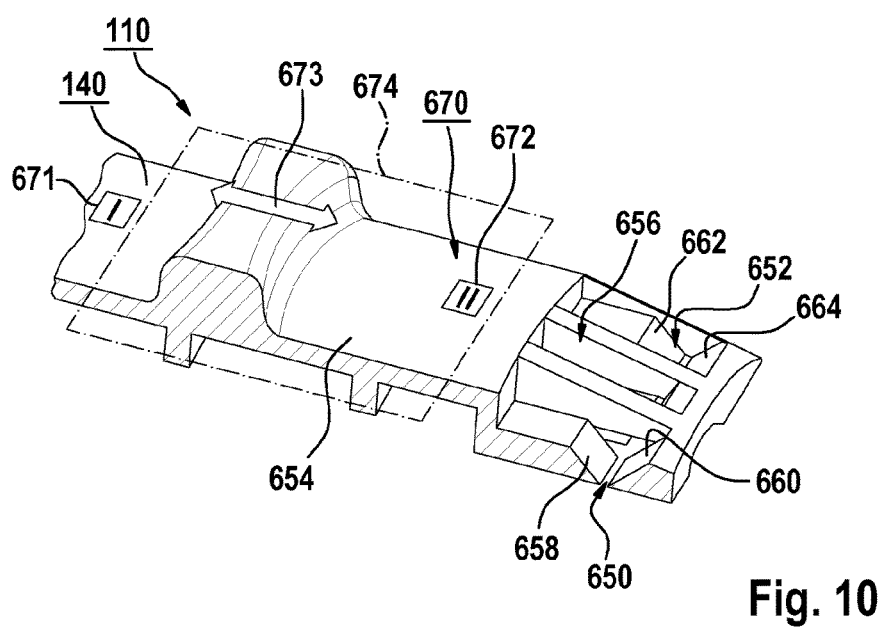
FIG. 10 shows a perspective view of the second shifting element, configured as a slide switch, for the gear shifting in the alternative specific embodiment of the planetary gear.

FIG. 10 shows second shifting element 140 from FIGS. 6 through 8, which may be configured as a slide switch and which may be configured for the direct gear shifting, and which may include two gaps 650, 652, which expand in a wedge shape, for accommodating upper control latches 902, 906 of bistable spring element 900 from FIG. 9. According to one specific embodiment, second shifting element 140 includes an approximately cuboidal base body 654 with a wedge-shaped flattened section 656, and may be made in one piece from an optionally fiber-reinforced plastic material. The two gaps 650, 652 completely pass through front wedge-shaped section 656 in the illustration, so that the two upper control latches 902, 906 of bistable spring element 900 from FIG. 9 may be introduced into gaps 650, 652, respectively.

Due to their approximately trapezoidal cross-sectional geometry in each case, gaps 650, 652 have two walls 658, 660 and 662, 664, respectively, which are oppositely inclined with respect to one another, to ensure a particularly smooth pivoting motion of control latches 902, 906 of bistable spring element 900 from FIG. 9. In addition, due to the two gaps 650, 652 which expand in a wedge shape, a particularly low-friction, precise response characteristic of bistable spring element 900 from FIG. 9 is provided during the change between its two stable states.

According to one specific embodiment, second shifting element 140 includes display device 670 from FIG. 6 with at least two schematically indicated graphical display elements 671, 672, which are used for displaying to a user of hand-held power tool 100 from FIG. 6 a particular shifting state of planetary gear 118 from FIGS. 6 through 8 as a function of first and second shift positions of shifting member 166 from FIGS. 6 through 8, or based on a particular gear shift position of second shifting element 140. Graphical display elements 671, 672 may be configured as markings on second shifting element 140, and in each case are apparent to the user via a display opening 674 formed in tool housing 110 from FIG. 1. In the illustration, graphical display element 671 is concealed by tool housing 110 and is therefore only indicated in dashed lines, while graphical display element 672 is visible, and displays to the user the second gear as the active gear of hand-held power tool 100.

Second shifting element 140 may be guided in a longitudinally displaceable manner in the direction of a double arrow 673 in tool housing 110 of hand-held power tool 100 from FIG. 6, and for each of the two possible gear shift positions, i.e., in the first gear or in the second gear of planetary gear 118 from FIGS. 6 through 8, assumes a clearly defined front or rear end position, so that, for example, either only first display element 671, concealed here, is visible for displaying the first gear in display opening 671, or only second display element 672 is visible to the user for indicating the second gear, as shown here.

Figure 11:
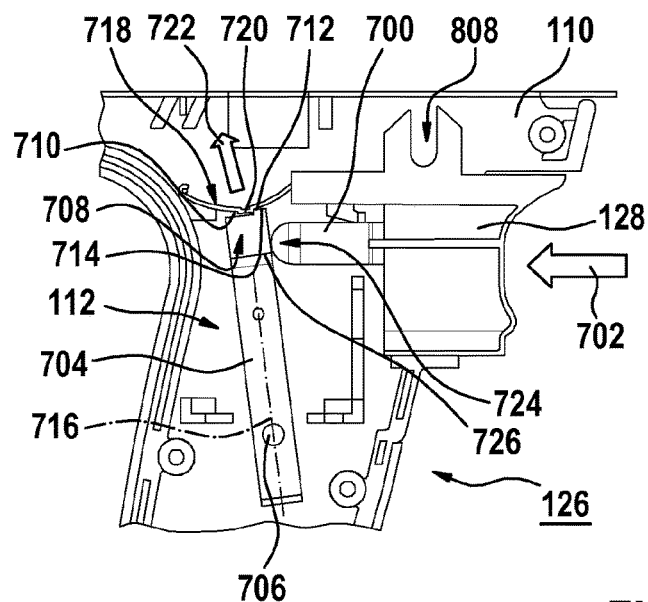
FIG. 11 shows a top view onto the first shifting element, configured as a hand switch, in the second alternative specific embodiment of the planetary gear.

FIG. 11 shows a detail of first shifting element 128 from FIG. 1, which may be configured as a hand switch, according to one specific embodiment in which the first shifting element includes a tappet 700 on the rear side which faces away from a front actuating surface, on the right in FIG. 11. The tappet may be configured in one piece with shifting element 128, which may be made in one piece from a plastic material.

When shifting element 128, starting from the position illustrated here, is actuated by a user in the direction of an arrow 702 against the action of force of a compression spring, not illustrated here, of an (electronic) on/off switch, an approximately rectangular lever 704, which is pivotably supported on a journal 706 formed on rear housing shell 112, for example, in the area of handle 126 of tool housing 110, pivots in an angular range of up to 20°. Journal 706 may be vertical, and integrally formed on tool housing 110 or a housing shell 112 thereof.

On its end facing away from journal 706, lever 704 may include a contact contour 708 with a first section 710, which via a step 712 merges into a second section 714 which is shorter than first section 710. Sections 710, 714 of contact contour 708 extend approximately in parallel. The two sections 710, 714 and step 712 extend across the entire width of lever 704, sections 710, 714 extending approximately at a right angle to a longitudinal center axis 716 of lever 704, and step 712 may be oriented at an angle with respect to longitudinal center axis 716 which differs slightly from 0°.

A spring member 718 which likewise is suitably fastened in housing shell 112 is implemented here, as an example, with an arched leaf spring, in the middle of which an elevation 720 which may be at least approximately semicircular, and which in the shown position of lever 704 rests against section 710 with a comparatively small mechanical pretension, and also against the side of step 712. When first shifting element 128, starting from the position illustrated here, is actuated further in the direction of arrow 702, step 712 of contact contour 708, after the predefined actuating force is exceeded, moves past elevation 720 and thus presses spring member 718 in the direction of an arrow 722, i.e., vertically in a direction facing away from journal 706, elevation 720 then sliding along farther on second section 714 of contact contour 708. In addition, a parallel offset 726 is formed in the area of a contact zone 724 in lever 704 having a rectangular cross-sectional geometry, as the result of which contact contour 708 extends at a small distance from housing shell 112, situated thereunder, when lever 704 pivots. Shortly before the bistable spring element (see FIGS. 6 through 8) changes from the one stable shift position into the other stable shift position, spring member 718, in particular for increasing the operational reliability and ease of use, thus allows feedback which is clearly haptically and/or acoustically perceivable to the user when first shifting element 128 has covered a specified distance in the direction of arrow 702 or has been pressed in far enough by the user.

In addition, a U-shaped guide cam 808 is formed on first shifting element 128 or the hand switch, and, as shown in FIG. 12, is in constant engagement with a pivotable coupling element 800 for indirectly controlling bistable spring element 900. U-shaped guide cam 808, similarly as for tappet 700, may be formed integrally or in one piece on first shifting element 128.

FIG. 12 shows the two shifting elements 128, 140 together with bistable spring element 900 from FIG. 6 and a coupling element 800 according to the present invention. Second shifting element 140, configured as a slide switch for the gear shifting of shiftable transmission 118, controls the two upper control latches 902, 906 of bistable spring element 900. The two cam latches 916, 918 are engaged with annular groove 268 of shifting member 166, configured as a shifting annulus gear. In contrast, the two lower control latches 904, 908 of bistable spring element 900 are only temporarily controlled by a coupling element 800, which may have an approximately roller shape and which may be supported in tool housing 110 from FIG. 1 so that it is pivotable about its transverse axis 802.

According to one specific embodiment, at least one control latch receptacle 804 is provided on coupling element 800, into which lower control latches 904, 908 may temporarily thread as a function of a particular position of coupling element 800 for controlling bistable spring element 900. Coupling element 800 is in constant engagement with first shifting element 128. For this purpose, a control cam 806 may be provided on coupling element 800 which is in constant engagement with guide cam 808, which is formed on first shifting element 128 (see FIG. 11). In the illustration, control cam 806 is situated on coupling element 800, approximately diametrically opposite from control latch receptacle 804.

By pushing in or pressing first shifting element 128 in the direction of an arrow 810, starting from the neutral position shown here, at the same time, an electronic switching regulator or on/off switch 812, for example, is actuated against the action of force of a cylindrical compression spring 814 of switching regulator 812 associated with the electronic switching regulator or on/off switch. With the aid of switching regulator 812, at least switching on and off as well as an infinitely speed variation of the drive motor of hand-held power tool 100 from FIG. 6 takes place as a function of the linear travel distance of first shifting element 128 in the direction of arrow 810. In addition, a change in the rotational direction of the drive motor may optionally take place with the aid of first shifting element 128. The control of lower control latches 904, 908 of bistable spring element 900 by first shifting element 128 takes place indirectly with the aid of interposed coupling element 800.

In the front shift position according to FIG. 12, shifting member 166 is disengaged from annulus gear 138 of rear planetary stage 172 from FIG. 6 of planetary gear 118, so that the planetary gear is shifted into the second gear. First shifting element 128 is released or completely relieved, and compression spring 814 is expanded, so that the drive motor of the hand-held power tool is switched off.

Figure 13:
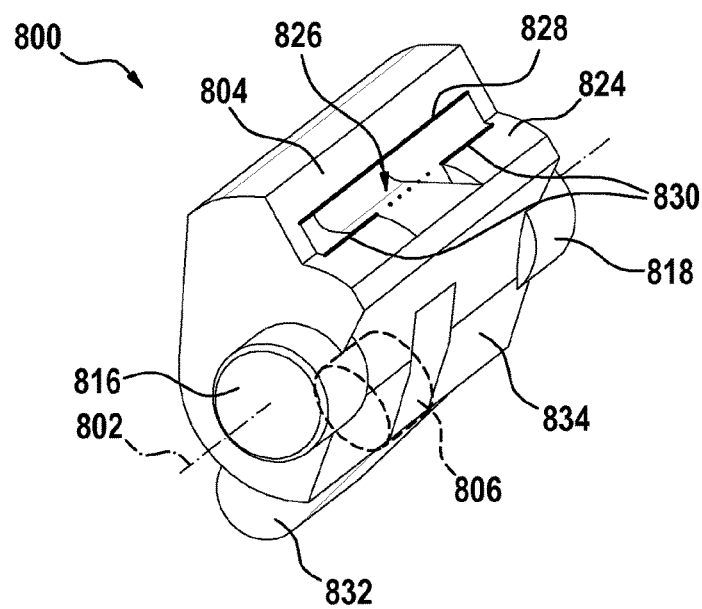
FIG. 13 shows an enlarged detailed view of the coupling element from FIG. 12.

FIG. 13 shows coupling element 800 from FIG. 12. The coupling element may include a cylindrical bearing journal 816, 818 on each side, centrically with respect to a transverse axis 802 or a rotational axis. Coupling element 800 may be pivotably accommodated in tool housing 110 from FIG. 1 with the aid of these bearing journals 816, 818, the transverse axis 802 extending approximately perpendicularly with respect to the dividing plane of corresponding housing shells of tool housing 110. In addition, coupling element 800 may include a stirrup-shaped control latch receptacle 804.

Control latch receptacle 804, which is integrally formed on an essentially roller-shaped base body 824 of coupling element 800, which may be has a rectangular opening 826 for at least temporarily accommodating or threading in the two lower control latches 904, 908 from FIG. 9. Parallel longitudinal edges of opening 826 represent a first and a second control edge 828, 830 for these two control latches 904, 908.

The lower control latches 904, 908 from FIG. 9 of bistable spring element 900 from FIG. 9 may thread into opening 826 in control latch receptacle 804 as a function of a particular rotational position of coupling element 800. First control edge 828 controls the two lower control latches 904, 908 in such a way that planetary gear 118 from FIG. 6 may shift from the second gear into the first gear. In contrast, second control edge 830, which may be interrupted approximately in the middle, controls lower control latches 904, 908, for example when first shifting element 128 is released, in such a way that planetary gear 118 from FIG. 6 shifts from the first gear into the second gear.

In addition, a cylindrical control cam 806 may be positioned on base body 824 of coupling element 800, opposite from control latch receptacle 804. The control cam may be held on base body 824 with the aid of two retaining arms 832, 834 which are integrally formed on base body 824 of coupling element 800, retaining arms 832, 834 forming an approximately central recess with which first shifting element 128 according to one specific embodiment may engage, at least in sections, or with which a section of first shifting element 128 from FIG. 12 which forms guide cam 808 may engage.

Figure 16:
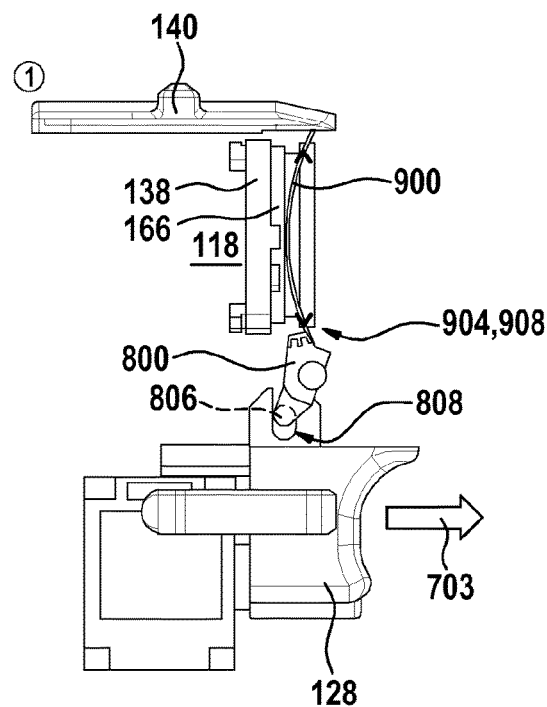

FIGS. 14 through 16, all of which are referred to in the further description, show a schematic illustration of a gear shifting operation for planetary gear 118 from FIG. 6, which in the present case is initially in a shifting state for the second gear which is displayed to the user in a clearly visually perceptible manner by second shifting element 140 or its display device 670 from FIG. 10. In the second gear, second shifting element 140 is in its rear gear shifting position and shifting annulus gear 166 may be lifted off from annulus gear 138, which is fixed to the housing, so that shifting annulus gear 166 may rotate, while bistable spring element 900 is in its right stable shift position, i.e., is deflected in a curve to the right. Coupling element 800 and the two lower control latches 904, 908 of bistable spring element 900 are disengaged. First shifting element 128 is not actuated, so that the drive motor of hand-held power tool 100 from FIG. 6 is switched off and compression spring 814 is at least partially relieved. In contrast, control cam 806 of coupling element 800 is engaged with guide cam 808 of first shifting element 128.

If, starting from FIG. 14, first shifting element 128 is now actuated or pressed in the direction of white arrow 702, it reaches a middle position illustrated in FIG. 15, coupling element 800 rotating in the clockwise direction and lower control latches 904, 908 being threaded into coupling element 800. In this state, planetary gear 118 is still in the second gear.

If first shifting element 128 is now fully pressed in against the action of force of compression spring 814, coupling element 800 pivots further in the clockwise direction, entraining the two lower control latches 904, 908, until bistable spring element 900 jumps into its left stable shift position illustrated in FIG. 16, and shifting annulus gear 166 moves axially to the left until it is engaged with annulus gear 138 and the shifting state of the first gear of planetary gear 118 is reached. The axial displacement of shifting annulus gear 166, as already explained above in detail, takes place with the aid of the two cam latches 916, 918 from FIG. 9 of bistable spring element 900, which engage with the annular groove of shifting member 166.

If the user, starting from the position reached in FIG. 16, once again releases first shifting element 128, it moves in the direction of arrow 703 due to the action of force of compression spring 814, coupling element 800 being pivoted in the counterclockwise direction. Coupling element 800 entrains threaded-in lower control latches 904, 908 of bistable spring element 900 until the latter jumps back into its right stable shift position shown in FIG. 14, and moves shifting annulus gear 166 axially to the right until it is no longer engaged with annulus gear 138, and a change of the shifting state of planetary gear 118 from the first gear into the second gear has taken place. The state of planetary gear 118 illustrated in FIG. 14 is thus once again achieved. Thus, according to the present invention, starting from the second gear, the planetary gear is automatically shifted into the first gear when hand switch 128 or the "acceleration switch" is pressed in.

Figure 17:
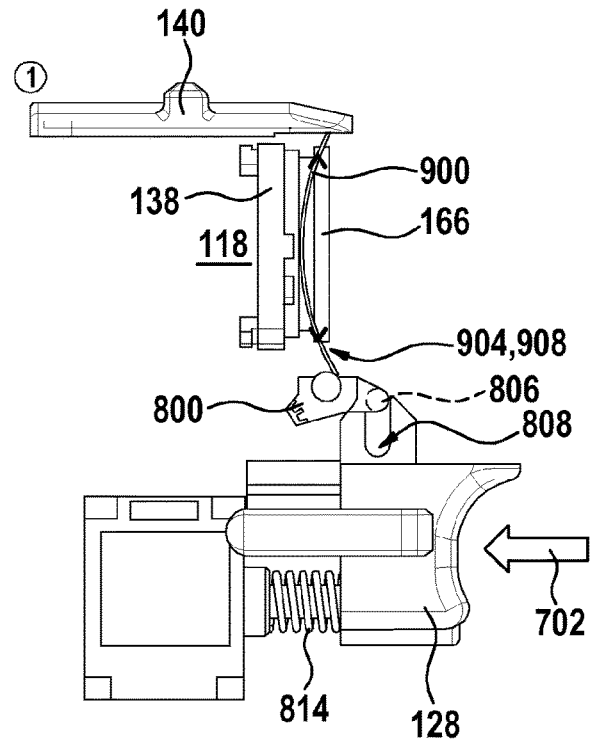
FIGS. 17, 18 and 19 show a schematic illustration of a gear shifting operation in the alternative specific embodiment of the shiftable transmission from FIG. 6, in which the transmission is in a gear shift position for the first gear.
Figure 18:
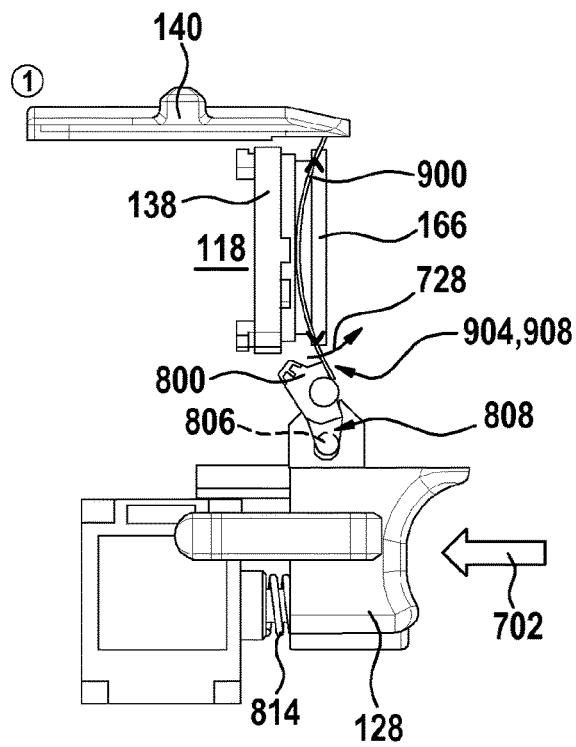
Figure 19:
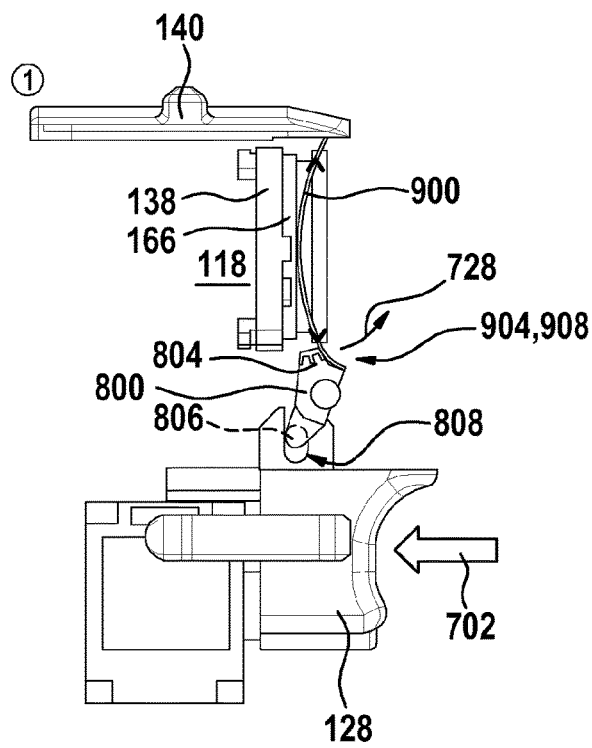

FIGS. 17 through 19, all of which are referred to in the further description, show a schematic illustration of a gear shifting operation for the planetary gear from FIG. 6. In FIG. 17, planetary gear 118 of hand-held power tool 100 from FIG. 6, in contrast to FIGS. 14 through 16, is in the first gear, in this state second shifting element 140 being axially moved to the right, i.e., in relation to annulus gear 138, in comparison to its position in FIG. 14. Shifting annulus gear 166 and annulus gear 138 are therefore engaged with one another, so that shifting annulus gear 166 is locked in a rotatably fixed manner, while bistable spring element 900 is in its left stable shift position, i.e., is deflected in a curve to the left; first control latches 904, 908 of bistable spring element 900 do not come into contact with coupling element 800. First shifting element 128 is released by the user, so that the drive motor of the hand-held power tool is switched off and compression spring 814 is at least partially relieved. Control cam 806 of coupling element 800 is still engaged with guide cam 808 of first shifting element 128.

If first shifting element 128, starting from its position in FIG. 17, is now moved to the left in the direction of arrow 702 until compression spring 814 according to FIG. 18 has been compressed to approximately half its original length, for example, coupling element 800 is pivoted anew in the clockwise direction by approximately one-fourth revolution about its transverse or rotational axis. Due to this pivoting of coupling element 800, although lower control latches 904, 908 come into contact with coupling element 800, they slide over it, since bistable spring element 900 in its left stable shift position is sufficiently curved to the left in an arched shape, so that the pivoting motion of coupling element 800 in the same direction consequently seeks to increase the existing curvature of bistable spring element 900 in the direction of black arrow 728, so that as a result, the state of bistable spring element 900 is maintained and the first gear of transmission 118 remains activated.

If first shifting element 128 is now moved even further or pressed in fully in the direction of arrow 702 until compression spring 814 according to FIG. 19 is compressed, control latch receptacle 804 of coupling element 800 ultimately rests against the two lower control latches 904, 908, which, however, due to the mechanism described above is not able to change the state of bistable spring element 900. Due to bistable spring element 900 being curved to the left in an arched shape, first control latches 908, 904 are not able to thread into control latch receptacle 804 in coupling element 800, and instead are only lightly touched on the side by the coupling element without triggering a change in the state of bistable spring element 900. As a result, gear shifting of planetary gear 118 cannot be effectuated, even by repeatedly pressing in and releasing first shifting element 128 or the hand switch, since in the present case, second shifting element 140 or the slide switch is in its front end position for the shifting state of planetary gear 118 corresponding to the first gear.

Also within the scope of FIGS. 17 through 19, the second shifting element or the slide switch acts as a visual display device for the user, and informs the user of the particular active gear selected or the instantaneous shifting state of planetary gear 118.

Figure 20:
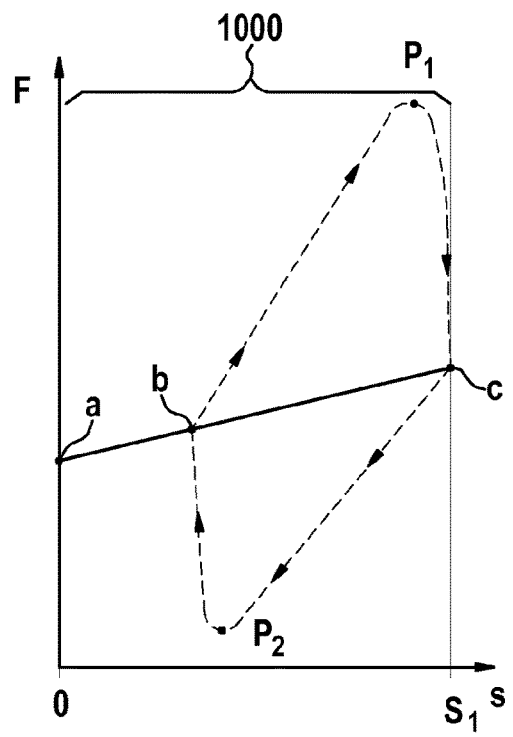
FIG. 20 shows a schematic curve of an (actuating) force acting on the first shifting element or the hand switch.

FIG. 20 shows an example of a curve of an (actuating) force F acting on first shifting element 128 described above, configured in the manner of a hand switch. Hand switch 128 is not actuated and is in its neutral position at a point a, so that hand-held power tool 100 from FIG. 6 is switched off, while hand switch 128 is fully pressed in at a point c, for example. The solid black straight line between point a and point c represents the curve of the (actuating) force when second shifting element 140 described above, configured in the manner of a slide switch, is in the gear shifting position for the first gear, and no change in the position or state (see FIGS. 17 through 19) of above-described bistable spring element 900 takes place, regardless of the actuation of hand switch 128.

In contrast, a dashed shifting force characteristic curve represents the curve of (actuating) force F of hand switch 128 which results according to FIGS. 14 through 16 when slide switch 140 is in its gear shifting position for the second gear (see FIG. 6). This curve represents a superimposition of the mechanical forces generated by cylindrical compression spring 814 from FIG. 12 of hand switch 128 and the bistable (bending) spring characteristic of bistable spring element 900.

In shift points $P_1$, $P_2$ of the dashed shifting force characteristic curve, situated in each case between the two points b and c, a shift or a change of state (deflection) of bistable spring element 900 takes place, and is thus accompanied by a gear shift of shiftable planetary gear 118. Due to the hysteresis of the dashed shifting force line, point b, shift point $P_1$, point c, and further shift point $P_2$ are passed through circularly until arriving back at point b, as indicated by small black arrows.

A speed control range or an acceleration range of the electric drive motor of hand-held power tool 100 may be situated between point b and the point of shifting from the second gear into the first gear, i.e., shift point $P_1$ of the dashed shifting force characteristic curve. A reduction in the speed of the drive motor of hand-held power tool 100 is thus achieved prior to the shifting from the first gear into the second gear of planetary gear 118, i.e., prior to reaching shift point $P_2$ of the dashed shifting force characteristic curve. An axial actuating range 1000 of hand switch 128 having length S1 advantageously extends between the not actuated position of hand switch 128, i.e., an (actuation) distance of zero, and point c, with an (actuation) distance of S1, in which planetary gear 118 shifts from the second gear into the first gear.

This design of the speed control range results in an improved shifting response, lower mechanical wear, and a reduced shifting jolt during the shifting operation from the first gear into the second gear due to a release of hand switch 128 after it is actuated. Another advantage is that the speed control of the drive motor in the second gear is possible at all times, and in the first gear is possible at least when the first gear has been selected via the second shifting element or the slide switch, which does not automatically reset.

What is claimed is:

1. A hand-held power tool, comprising:
 a shiftable transmission, which is shiftable at least between a first gear and a second gear via a shifting member;
 wherein the shifting member is coupled to a spring element, which for the gear shifting is indirectly or directly actuatable at least via a first and a second shifting element, a coupling element which is coupleable to the spring element being associated with the first shifting element, the coupling element being configured to allow gear shifting by actuating the first shifting element only for the case that the second shifting element is in a predefined gear shift position,
 wherein the coupling element includes a control cam which is engaged with a guide cam formed on the first shifting element, so that the coupling element is pivotable about an associated transverse axis with the first shifting element to actuate the spring element.

2. A hand-held power tool, comprising:
 a shiftable transmission, which is shiftable at least between a first gear and a second gear via a shifting member;
 wherein the shifting member is coupled to a spring element, which for the gear shifting is indirectly or directly actuatable at least via a first and a second shifting element,
 a coupling element which is associated with the first shifting element, the coupling element being configured for coupling the spring element to the first shifting element when the first shifting element is actuated and only for the case that the second shifting element is in a predefined gear shift position,
 wherein the coupling element includes a control cam which is engaged with a guide cam formed on the first shifting element, so that the coupling element is pivotable about an associated transverse axis with the first shifting element to actuate the spring element.

3. A hand-held power tool, comprising:
 a shiftable transmission, which is shiftable at least between a first gear and a second gear via a shifting member;
 wherein the shifting member is coupled to a spring element, which for the gear shifting is indirectly or directly actuatable at least via a first and a second shifting element,
 a coupling element which is associated with the first shifting element, the coupling element being configured for coupling the spring element to the first shifting element when the first shifting element is actuated and only for the case that the second shifting element is in a predefined gear shift position,
 wherein the spring element includes at least two radially inwardly directed cam latches which are coupled to the shifting member, and which are configured for moving the shifting member into a particular shift position which is associated with the first or second gear when the spring element is actuated for the gear shifting.

4. A hand-held power tool, comprising:
 a shiftable transmission, which is shiftable at least between a first gear and a second gear via a shifting member;

wherein the shifting member is coupled to a spring element, which for the gear shifting is indirectly or directly actuatable at least via a first and a second shifting element,
a coupling element which is associated with the first shifting element, the coupling element being configured for coupling the spring element to the first shifting element when the first shifting element is actuated and only for the case that the second shifting element is in a predefined gear shift position,
wherein, based on the second shifting element being in the predefined gear shift position, the coupling element is configured to couple the spring element to the first shifting element when the first shifting element is actuated,
wherein, based on the second shifting element being in another gear shift position, the coupling element is configured to not couple the spring element to the first shifting element when the first shifting element is actuated.

5. The hand-held power tool of claim 4, wherein the coupling element is configured to carry out, after a gear shifting by actuating the first shifting element, an inverse gear shifting by releasing the first shifting element.

6. The hand-held power tool of claim 4, wherein the spring element includes a ring-shaped base body which is situated, at least in sections, in the area between the shifting member and an associated gear housing in which the shiftable transmission is situated.

7. The hand-held power tool of claim 4, wherein the spring element includes a ring-shaped base body which is situated, at least in sections, in the area between a gear housing, in which the shiftable transmission is situated, and a tool housing.

8. The hand-held power tool of claim 4, wherein the spring element includes at least two radially inwardly directed cam latches which are coupled to the shifting member, and which are configured for moving the shifting member into a particular shift position which is associated with the first or second gear when the spring element is actuated for the gear shifting.

9. The hand-held power tool of claim 4, wherein the spring element includes at least two radially outwardly directed control latches for controlling the spring element, at least one first control latch being coupleable to the first shifting element, and at least one second control latch being indirectly or directly coupled to the second shifting element.

10. The hand-held power tool of claim 4, wherein the first shifting element is provided for creating an acceleration function and gear shifting function, and the second shifting element provides a gear shifting function and/or an operating mode switching function.

11. The hand-held power tool of claim 10, wherein an acceleration range is associated with the first shifting element, and during an actuation of the first shifting element is limited at least to an actuation range between a released position of the first shifting element and a shift point in which gear shifting takes place between the first and the second gear.

12. The hand-held power tool of claim 4, wherein the coupling element includes a control cam which is engaged with a guide cam formed on the first shifting element, so that the coupling element is pivotable about an associated transverse axis with the first shifting element to actuate the spring element.

13. The hand-held power tool of claim 12, wherein the coupling element includes at least one control latch receptacle for at least temporarily accommodating at least one control latch of the spring element.

14. The hand-held power tool of claim 4, wherein the spring element is pivotably supported on at least two body edges, in each case in an at least approximately V-shaped bearing groove.

15. The hand-held power tool of claim 14, wherein the at least two body edges are configured as radial extensions on a ring-shaped base body of the spring element.

16. The hand-held power tool of claim 14, wherein a flashing is associated with each of the at least approximately V-shaped bearing groove.

17. The hand-held power tool of claim 4, wherein a spring member for generating a pressure point is associated with the first shifting element.

18. The hand-held power tool of claim 4, wherein the second shifting element has at least one gap which expands in a wedge shape for controlling at least one control latch of the spring element.

19. The hand-held power tool of claim 4, wherein the shiftable transmission is configured as a planetary gear which includes at least one planetary stage, the shifting member being configured as a shifting annulus gear.

20. The hand-held power tool of claim 19, wherein the shifting member for deactivating at least one planetary stage is radially coupled to at least one planet carrier of one of the at least one planetary stage.

21. The hand-held power tool of claim 4, wherein a display device is associated with the second shifting element, and the second shifting element is coupled to the shifting member via the spring element so that the display device displays an active gear in each case of the shiftable transmission as a function of the first and second shift positions of the shifting member.

22. The hand-held power tool of claim 4, wherein the spring element is configured as a bistable spring element which assumes a stable shift position in each case in a first shift position of the shifting member associated with the first gear, and in a second shift position of the shifting member associated with the second gear, and which assumes an unstable position in an intermediate position of the shifting member which is situated between the first and second shift positions of the shifting member.

23. The hand-held power tool of claim 4, wherein the first shifting element and the second shifting element are manually operable shifting elements.

24. A hand-held power tool, comprising:
a shiftable transmission for driving a drive shaft, which is situated in a gear housing and is shiftable at least between a first gear and a second gear via a shifting member;
wherein an actuating element which is pivotably supported in the gear housing is associated with the shifting member, the actuating element being configured as a bistable spring element and situated, at least in sections, in the area between the shifting member and the gear housing, the bistable spring element being actuatable for the gear shifting, and assumes a stable shift position in at least one shift position of the shifting member associated with the first or second gear, and assumes an unstable position in an intermediate position of the shifting member which is situated between shift positions of the shifting member associated with the first and second gears,
wherein the bistable spring element includes at least two radially outwardly directed control latches which are configured to allow an actuation of the bistable spring element for the gear shifting via at least a first or a second shifting element.

25. The hand-held power tool of claim 24, wherein the bistable spring element includes a ring-shaped base body which is situated in the area between the shifting member and the gear housing.

26. The hand-held power tool of claim 24, wherein the bistable spring element includes at least two radially inwardly directed cam latches which are coupled to the shifting member, and which are configured for moving the shifting member into a particular shift position which is associated with the first or second gear when the bistable spring element is actuated for the gear shifting.

27. The hand-held power tool of claim 24, wherein the bistable spring element includes at least two radially outwardly directed control latches which are configured to allow an actuation of the bistable spring element for the gear shifting via at least a first and a second shifting element.

28. The hand-held power tool of claim 24, wherein the first shifting element is provided for creating an acceleration function, and the second shifting element provides a gear shifting function.

29. The hand-held power tool of claim 24, wherein the bistable spring element is pivotably supported in the gear housing on at least two body edges.

30. The hand-held power tool of claim 29, wherein the at least two body edges are configured as radial extensions on the ring-shaped base body of the bistable spring element.

31. The hand-held power tool of claim 24, wherein a bearing element, configured as a bearing plate for pivotably supporting the bistable spring element, is situated in the gear housing.

32. The hand-held power tool of claim 31, wherein at least two axial bearing arms for pivotably supporting the bistable spring element are formed on the bearing element.

33. The hand-held power tool of claim 24, wherein the shiftable transmission is configured as a planetary gear which includes at least three planetary stages, the shifting member being configured as a shifting annulus gear.

34. The hand-held power tool of claim 24, wherein the bistable spring element for the gear shifting is indirectly or directly actuatable at least via a first shifting element and a second shifting element, a coupling element which is coupleable to the bistable spring element being associated with the first shifting element, the coupling element being configured for gear shifting by actuating the first shifting element only for the case that the second shifting element is in a predefined gear shift position.

* * * * *